US010828562B2

(12) United States Patent
Yamano et al.

(10) Patent No.: US 10,828,562 B2
(45) Date of Patent: *Nov. 10, 2020

(54) VIBRATING APPARATUS AND VIBRATING METHOD

(71) Applicant: SONY CORPORATION, Tokyo (JP)

(72) Inventors: Ikuo Yamano, Tokyo (JP); Akihiro Komori, Tokyo (JP); Yusuke Nakagawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,485

(22) Filed: Dec. 5, 2018

(65) Prior Publication Data

US 2019/0105563 A1 Apr. 11, 2019

Related U.S. Application Data

(63) Continuation of application No. 15/311,533, filed as application No. PCT/JP2015/056540 on Mar. 5, 2015, now Pat. No. 10,150,029.

(30) Foreign Application Priority Data

Jun. 4, 2014 (JP) ................................ 2014-115793

(51) Int. Cl.
*A63F 13/285* (2014.01)
*G06F 3/16* (2006.01)
(Continued)

(52) U.S. Cl.
CPC .......... *A63F 13/285* (2014.09); *A63F 13/214* (2014.09); *A63F 13/54* (2014.09);
(Continued)

(58) Field of Classification Search
CPC .. A63F 13/25; A63F 13/28; A63F 2300/1037; A63F 2300/202
See application file for complete search history.

(56) References Cited

U.S. PATENT DOCUMENTS 5,691,898 A * 11/1997 Rosenberg ............ A63F 13/285
700/85
5,857,986 A 1/1999 Moriyasu
(Continued)

FOREIGN PATENT DOCUMENTS

AU 2003299997 A1 8/2004
CA 2788705 A1 8/2011
(Continued)

OTHER PUBLICATIONS

International Search Report and Written Opinion of PCT Application No. PCT/JP2015/056540, dated Jun. 2, 2015, 09 pages of English Translation and 08 pages of ISRWO.
(Continued)

*Primary Examiner* — Kevin Y Kim
(74) *Attorney, Agent, or Firm* — Chip Law Group

(57) ABSTRACT

A vibrating apparatus which can provide a favorable vibratory sense to the operator who operates electronic equipment. The vibrating apparatus includes an equipment holding unit that holds electronic equipment, at least one gripped portion projecting from the equipment holding unit and gripped by an operator, and at least one vibrating unit that vibrates based on a sound signal acquired from the electronic equipment and vibrates the at least one gripped portion.

16 Claims, 14 Drawing Sheets

(51) Int. Cl.
- *A63F 13/54* (2014.01)
- *A63F 13/214* (2014.01)
- *G06F 1/16* (2006.01)
- *H04R 1/26* (2006.01)
- *A63F 13/92* (2014.01)
- *A63F 13/98* (2014.01)
- *G06F 1/26* (2006.01)
- *G06F 3/01* (2006.01)
- *H04R 1/02* (2006.01)
- *H04R 3/14* (2006.01)

(52) U.S. Cl.
CPC .............. *A63F 13/92* (2014.09); *A63F 13/98* (2014.09); *G06F 1/1632* (2013.01); *G06F 1/266* (2013.01); *G06F 3/016* (2013.01); *G06F 3/16* (2013.01); *G06F 3/165* (2013.01); *H04R 1/26* (2013.01); *G06F 2200/1633* (2013.01); *H04R 1/028* (2013.01); *H04R 3/14* (2013.01); *H04R 2400/03* (2013.01)

(56) References Cited

U.S. PATENT DOCUMENTS

| | | | |
|---|---|---|---|
| 6,222,347 | B1 | 4/2001 | Gong |
| 6,402,620 | B1 | 6/2002 | Naghi |
| 6,422,944 | B1 | 7/2002 | Naghi |
| 6,672,962 | B1 | 1/2004 | Ozaki et al. |
| 6,743,100 | B1 | 6/2004 | Neiser |
| 2002/0087901 | A1 | 7/2002 | Cooper et al. |
| 2002/0155890 | A1 | 10/2002 | Ha et al. |
| 2003/0067440 | A1* | 4/2003 | Rank .................. A63F 13/5255 345/156 |
| 2003/0068053 | A1 | 4/2003 | Chu |
| 2003/0109314 | A1* | 6/2003 | Ku .......................... A63F 13/02 463/47 |
| 2004/0137983 | A1 | 7/2004 | Kerr et al. |
| 2006/0103996 | A1 | 5/2006 | Carroll et al. |
| 2006/0279039 | A1 | 12/2006 | Krieger et al. |
| 2007/0087777 | A1 | 4/2007 | Shibuya et al. |
| 2007/0091836 | A1 | 4/2007 | Oprescu-Surcobe |
| 2009/0079690 | A1 | 3/2009 | Watson et al. |
| 2009/0124378 | A1 | 5/2009 | Takada et al. |
| 2011/0183752 | A1* | 7/2011 | Bey .......................... A63F 13/00 463/30 |
| 2012/0050970 | A1 | 3/2012 | Murakata et al. |
| 2013/0288777 | A1* | 10/2013 | Short ........................ A61B 5/16 463/23 |
| 2014/0368440 | A1 | 12/2014 | Polyakov et al. |

FOREIGN PATENT DOCUMENTS

| | | |
|---|---|---|
| CN | 101391146 A | 3/2009 |
| CN | 102939570 A | 2/2013 |
| EP | 2039404 A2 | 3/2009 |
| JP | 2007-150695 A | 6/2007 |
| JP | 2007-324924 A | 12/2007 |
| JP | 2009-72600 A | 4/2009 |
| JP | 2012-74021 A | 4/2012 |
| JP | 2013-519153 A | 5/2013 |
| KR | 10-2007-0036656 A | 4/2007 |
| KR | 10-2009-0031332 A | 3/2009 |
| KR | 10-2012-0123505 A | 11/2012 |
| MX | 2012008968 A | 8/2012 |
| TW | 201205910 A | 2/2012 |
| WO | 2004/064953 A2 | 8/2004 |
| WO | 2006/099205 A2 | 9/2006 |
| WO | 2007/139050 A1 | 12/2007 |
| WO | 2011/097020 A2 | 8/2011 |

OTHER PUBLICATIONS

International Preliminary Report on Patentability of PCT Application No. PCT/JP2015/056540, dated Dec. 15 2016, 09 pages of English Translation and 06 pages of IPRP.

Notice of Allowance and Fees Due for U.S. Appl. No. 15/311,533, dated Aug. 8, 2018, 08 pages.

Advisory Action for U.S. Appl. No. 15/311,533, dated Jun. 21, 2018, 03 pages.

Final Rejection for U.S. Appl. No. 15/311,533, dated Apr. 13, 2018, 11 pages.

Non-Final Rejection for U.S. Appl. No. 15/311,533, dated Dec. 21, 2017, 11 pages.

* cited by examiner

VIBRATING APPARATUS AND VIBRATING METHOD

The present application is a continuation application of U.S. patent application Ser. No. 15/311,533, filed Nov. 16, 2016, which is a National Stage Entry of PCT/JP2015/056540, filed Mar. 5, 2015, and claims the benefit of priority from prior Japanese Patent Application JP 2014-115793, filed Jun. 4, 2014, the entire content of which is hereby incorporated by reference.

TECHNICAL FIELD

The present disclosure relates to a vibrating apparatus and a vibrating method.

BACKGROUND ART

In recent years, in order to increase realistic sensation and a sense of immersion of content, a technology is used in which an actuator, or the like, is incorporated into an input apparatus which is used to operate content of a game, or the like, and vibration or a sense of touch is fed back to an operator.

For example, Patent Literature 1 discloses an input apparatus which monitors a signal such as sound from content during execution of the content, and, when the monitored signal satisfies predetermined criteria, feeds back vibration, or the like, to a user.

CITATION LIST

Patent Literature

Patent Literature 1: JP 2009-72600A

SUMMARY OF INVENTION

Technical Problem

On the other hand, in recent years, portable electronic equipment such as mobile game machine and a smartphone has been widely spread, and viewing content using such electronic equipment becomes common.

However, while such electronic equipment can present information to a visual and acoustic sense of an operator using an image display function and a sound output function, it is difficult to present information to a sense of touch of the operator. Therefore, the present disclosure proposes a vibrating apparatus and a vibrating method which can provide a favorable vibratory sense to the operator who operates electronic equipment.

Solution to Problem

According to the present disclosure, there is provided a vibrating apparatus including: an equipment holding unit configured to hold electronic equipment; at least one gripped portion projecting from the equipment holding unit and gripped by an operator; and at least one vibrating unit configured to vibrate based on a sound signal acquired from the electronic equipment and vibrate the at least one gripped portion.

According to the present disclosure, there is provided a vibrating method including: acquiring, by a vibrating apparatus, a sound signal from electronic equipment held at an equipment holding unit of the vibrating apparatus; and vibrating, by the vibrating apparatus, at least one gripped portion projecting from the equipment holding unit and gripped by an operator, based on the acquired sound signal.

According to the present disclosure, the vibrating apparatus can vibrate a gripped portion gripped by the operator based on a sound signal from the held electronic equipment.

Advantageous Effects of Invention

As described above, according to the present disclosure, it is possible to provide a favorable vibratory sense to an operator who operates electronic equipment. Note that the effects described above are not necessarily limitative. With or in the place of the above effects, there may be achieved any one of the effects described in this specification or other effects that may be grasped from this specification.

DESCRIPTION OF EMBODIMENTS

Figure 1:
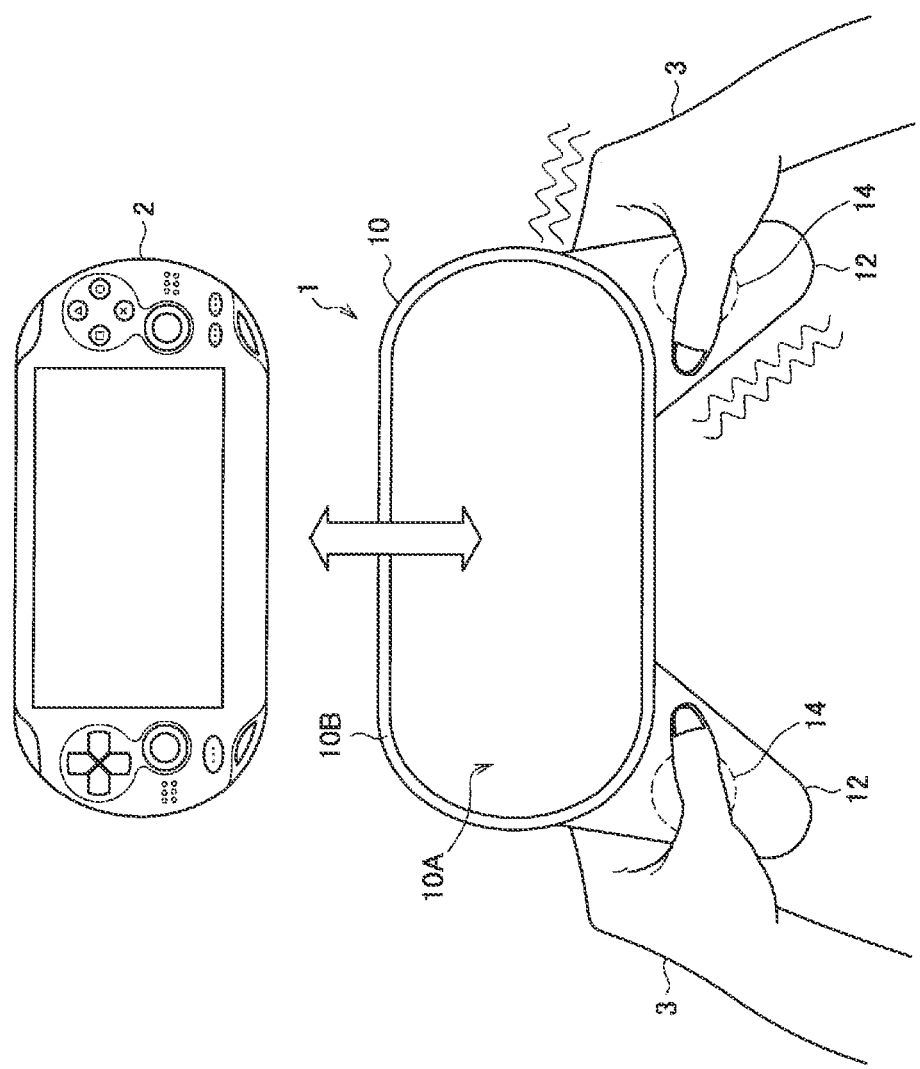
FIG. 1 is an explanatory diagram illustrating outline of a vibrating apparatus according to the present disclosure.

Hereinafter, preferred embodiments of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Outline of vibrating apparatus according to the present disclosure
2. First Embodiment
2.1. Configuration example of vibrating apparatus
2.2. Control example of vibrating apparatus
2.3. Appearance example of vibrating apparatus
3. Second Embodiment
3.1. Configuration example of vibrating apparatus
4. Third Embodiment
4.1. Appearance example of vibrating apparatus
4.2. Configuration example of vibrating apparatus
5. Fourth Embodiment
5.1. Configuration example of vibrating apparatus
5.2. Appearance example of vibrating apparatus
6. Fifth Embodiment
6.1. Configuration example of vibrating apparatus
7. Conclusion

1. OUTLINE OF VIBRATING APPARATUS ACCORDING TO THE PRESENT DISCLOSURE

First, outline of a vibrating apparatus according to the present disclosure will be described with reference to FIG. 1. FIG. 1 is an explanatory diagram illustrating the outline of the vibrating apparatus according to the present disclosure. As illustrated in FIG. 1, the vibrating apparatus 1 according to the present disclosure includes an equipment holding unit 10, a gripped portion 12 and a vibrating unit 14.

Here, the vibrating apparatus 1 holds electronic equipment 2 by the equipment holding unit 10. Therefore, an operator 3 can operate the electronic equipment 2 while gripping the gripped portion 12 of the vibrating apparatus 1. Note that the electronic equipment 2 is a small portable information processing apparatus such as, for example, mobile game machine, a smartphone and a tablet terminal.

The equipment holding unit 10 is a structural member which holds the electronic equipment 2. For example, the equipment holding unit 10 includes a concave portion 10A having a size substantially matching the outline of the electronic equipment 2, and the electronic equipment 2 is fitted into the concave portion 10A. Further, a claw portion 10B is provided around the concave portion 10A, and the equipment holding unit 10 fixes and holds the electronic equipment 2 by clamping the electronic equipment 2 at the claw portion 10B.

Note that the equipment holding unit 10 may have any shape and may hold the electronic equipment 2 using any mechanism if the equipment holding unit 10 can hold the electronic equipment 2 in a fixed state. For example, the equipment holding unit 10 may fix the electronic equipment 2 using a clip, a band, a belt, or the like. However, the equipment holding unit 10 preferably has a mechanism which allows attachment and detachment of the electronic equipment 2 so as to be able to change the electronic equipment 2 to be held.

The gripped portion 12 is a structural member gripped by the operator 3 of the electronic equipment 2. Specifically, the gripped portion 12 is formed to project from the equipment holding unit 10 and has a grip shape of a size which can be gripped by the operator 3 with the whole flat of the hand. Further, a plurality of gripped portions 12 may be formed to project from the equipment holding unit 10, and, for example, may be formed to respectively project from two locations of the equipment holding unit 10, which are separate from each other, so as to correspond to right and left hands of the operator 3.

The vibrating unit 14 is a vibration actuator which vibrates the gripped portion 12. Specifically, the vibrating unit 14 is provided at the gripped portion 12 and vibrates the gripped portion 12 by vibrating based on a sound signal from the electronic equipment 2. For example, the vibrating unit 14 may be an eccentric motor, a voice coil motor or a piezo actuator incorporated into the gripped portion 12.

Note that, while FIG. 1 illustrates a configuration where the vibrating apparatus 1 has two gripped portions 12, and the vibrating units 14 are respectively provided at the gripped portions 12, the technology of the present disclosure is not limited to this configuration. It is only necessary to provide at least one or more gripped portions 12 at the vibrating apparatus 1, and it is only necessary to provide at least one or more vibrating units 14 at the vibrating apparatus 1. For example, when a plurality of gripped portions 12 are provided at the vibrating apparatus 1, it is only necessary to provide the vibrating units 14 at at least one or more gripped portions 12 and vibrate at least one or more gripped portions 12.

The vibrating apparatus 1 according to the present disclosure can efficiently transmit a vibratory sense to the operator 3 by the vibrating unit 14 vibrating the gripped portion 12 gripped by the operator 3 with the whole flat of the hand. Particularly, vibration of a frequency band exceeding 100 Hz is accepted by a tactile receptor called a Pacinian corpuscle in a sense of touch of a human. Because the Pacinian corpuscle exists at a deep portion of the finger, as an area of contact between an object to be contacted and the finger becomes greater, the obtained vibratory sense can be made larger. Therefore, the vibrating apparatus 1 according to the present disclosure can transmit a larger vibratory sense to the operator 3 by the vibrating unit 14 vibrating the gripped portion 12 gripped by the operator 3 with the whole flat of the hand than a case where the operator 3 holds the electronic equipment 2 with only a tip of the finger.

Further, because the vibrating apparatus 1 according to the present disclosure causes the vibrating unit 14 to vibrate based on the sound signal from the electronic equipment 2, even when content executed at the electronic equipment 2 does not send a signal dedicated for causing the vibrating apparatus 1 to vibrate, it is possible to transmit a vibratory sense to the operator 3.

2. FIRST EMBODIMENT

Next, a vibrating apparatus 1A according to a first embodiment of the present disclosure which implements the above-described configuration will be described with reference to FIGS. 2, 3, 4 and 5.

[2.1. Configuration example of vibrating apparatus]

Figure 2:
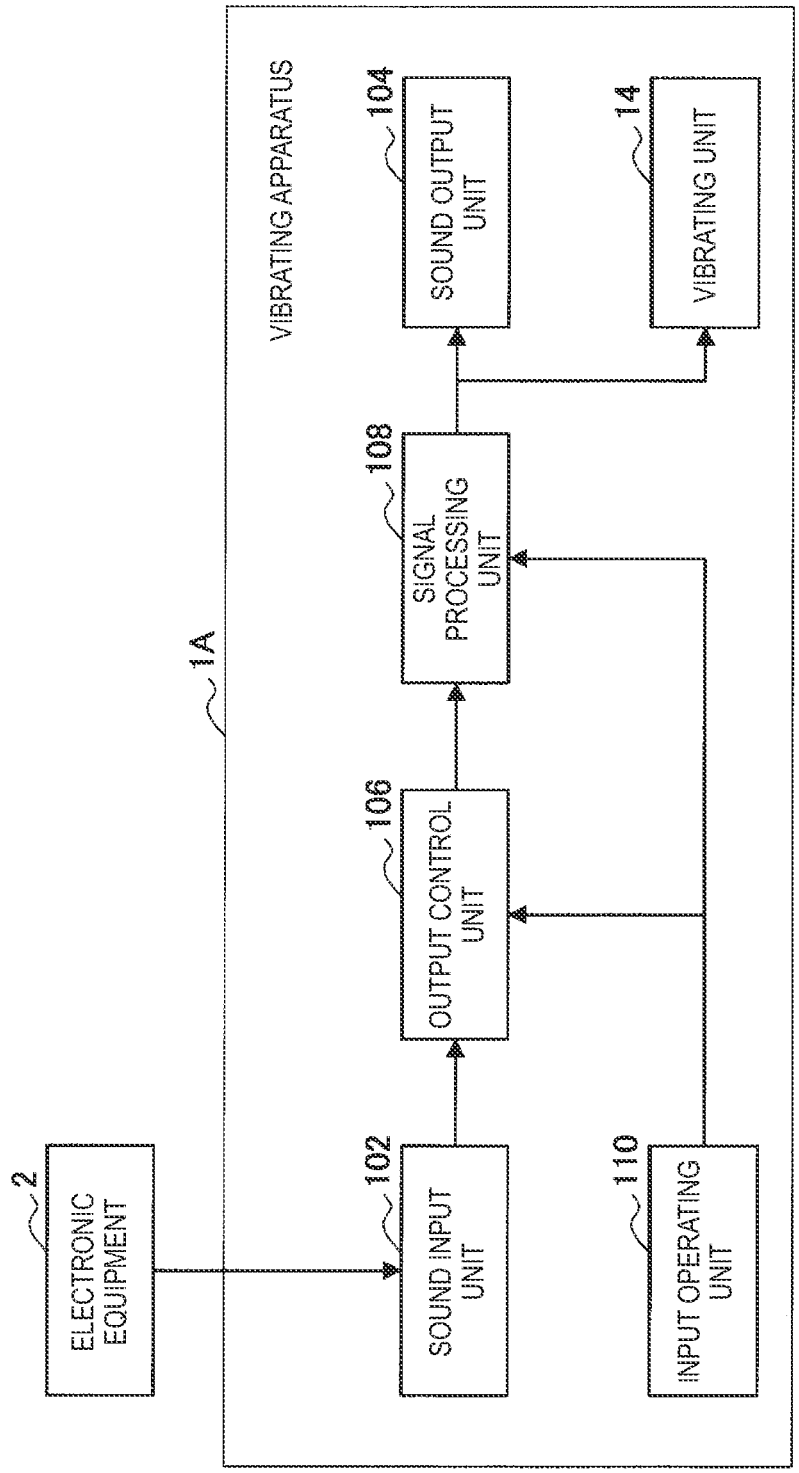
FIG. 2 is a block diagram illustrating a configuration of a vibrating apparatus according to a first embodiment of the present disclosure.

First, a configuration of the vibrating apparatus 1A according to the first embodiment of the present disclosure will be described with reference to FIG. 2. FIG. 2 is a block diagram illustrating the configuration of the vibrating apparatus 1A according to the first embodiment of the present disclosure. As illustrated in FIG. 2, the vibrating apparatus 1A includes a sound input unit 102, a sound output unit 104, a vibrating unit 14, a signal processing unit 108, an output control unit 106 and an input operating unit 110.

The sound input unit 102 acquires a sound signal from the electronic equipment 2. Specifically, the sound input unit 102 is a wired or wireless connection interface for acquiring a sound signal output from the electronic equipment 2 held by the equipment holding unit 10. For example, the sound input unit 102 may be a connection interface including a phone plug such as a stereo mini plug and an audio interface such as an AUX terminal or a connection interface including a universal serial bus (USB) terminal. Further, the sound input unit 102 may be a connection interface which acquires a sound signal through wireless communication such as Bluetooth (registered trademark) and Wi-Fi (registered trademark).

The vibrating unit 14 vibrates based on the sound signal acquired from the electronic equipment 2 and vibrates the gripped portion 12. Specifically, the vibrating unit 14 is a vibration actuator, and vibrates by receiving input of the sound signal which is acquired from the electronic equipment 2 and subjected to signal processing. For example, the vibrating unit 14 may be an eccentric motor, a voice coil motor, a piezo actuator, or the like.

Note that the vibrating unit 14 is preferably a voice coil motor, a piezo actuator, or the like, because vibration of a wide band can be caused. Further, the vibrating unit 14 is more preferably an eccentric motor because stronger vibration can be caused. Further, the vibrating unit 14 may include a plurality of different types of vibration actuators and may cause different vibration at respective vibration actuators.

The sound output unit 104 outputs sound based on the sound signal acquired from the electronic equipment 2. Specifically, the sound output unit 104 is a speaker, and converts the sound signal acquired from the electronic equipment 2 into sound and outputs the sound. Further, the sound output unit 104 may include a connection interface including an audio output interface for outputting sound to a head phone or an earphone.

For example, when the vibrating apparatus 1A acquires a sound signal via an output terminal to the head phone or the earphone at the electronic equipment 2, there is a case where the electronic equipment 2 does not output sound from the incorporated speaker. In such a case, the vibrating apparatus 1A can transmit sound information to the operator 3 by outputting the sound using the sound output unit 104.

The output control unit 106 respectively controls whether to cause the vibrating unit 14 to vibrate and whether to output sound from the sound output unit 104. For example, the output control unit 106 controls the vibrating unit 14 and output from the sound output unit 104 based on selection of setting of "vibration and sound off", "sound on" (that is, vibration off), "vibration on" (that is, sound off), and "vibration and sound on" selected by the operator 3 through the input operating unit 110. For example, the output control unit 106 may prevent vibration and sound output by performing control so as not to supply power to functions for which "off" is selected by the operator 3 among the vibration function and the sound output function. According to this configuration, when sound output is not necessary on a train, or the like, or when a vibratory sense is not necessary, the vibrating apparatus 1A can control vibration and sound output independently.

Further, the output control unit 106 may control a degree of vibration of the vibrating unit 14 and a volume of the sound output of the sound output unit 104 independently. Specifically, the sound control unit 106 includes an amplifier circuit and may control the degree of the vibration of the vibrating unit 14 and the volume of the sound output of the sound output unit 104 by respectively controlling amplification amounts of the sound signals input to the vibrating unit 14 and the sound output unit 104. Note that the degree of the vibration of the vibrating unit 14 and the volume of the sound output of the sound output unit 104 controlled at the output control unit 106 are determined by input by the operator 3 through the input operating unit 110.

Here, when the output control unit 106 respectively controls the amplification amounts of the sound signals input to the vibrating unit 14 and the sound output unit 104, the output control unit 106 preferably respectively controls the amplification amounts of the sound signals after being subjected to signal processing at the signal processing unit 108. Specifically, the output control unit 106 is preferably disposed after the signal processing unit 108 in the block diagram illustrated in FIG. 2.

The signal processing unit 108 is, for example, a digital signal processor (DPS) circuit, and performs signal processing on the sound signal acquired from the electronic equipment 2. Specifically, the signal processing unit 108 controls vibration and sound output at the vibrating unit 14 and the sound output unit 104 by performing predetermined signal processing on the sound signal acquired from the electronic equipment 2 according to types of content. For example, the signal processing unit 108 may include signal processing corresponding to types of content such as "Race", "FPS" and "Movie" to be executed at the electronic equipment 2 as setting in advance, and may perform signal processing corresponding to the setting selected by the operator 3 through the input operating unit 110 on the sound signal.

More specifically, when the setting of "Race" is selected, the signal processing unit 108 may perform signal processing of emphasizing vibration corresponding to vibration of a vehicle body and an engine and sound corresponding to engine noise and sound of a brake on the sound signal. Further, when the setting of "FPS" is selected, the signal processing unit 108 may perform signal processing of emphasizing vibration corresponding to vibration of gunfire and sound corresponding to sound of gunfire on the sound signal. Further, when the setting of "Movie" is selected, the signal processing unit 108 may perform signal processing of emphasizing a difference between an L sound signal and an R sound signal included in the sound signal on the sound signal.

Further, the signal processing unit 108 may perform signal processing on the sound signal acquired from the electronic equipment 2 so that the sound signal becomes a signal suitable for causing the vibrating unit 14 to vibrate.

For example, because the eccentric motor is a vibration actuator which causes vibration by a motor to which weight which has unevenness in shape is attached to a shaft continuing to rotate at a predetermined rotation number, it is possible to cause vibration more preferably with a DC voltage than with an AC voltage. Therefore, when the vibrating unit 14 is an eccentric motor, the signal processing unit 108 may perform signal processing of converting the sound signal acquired from the electronic equipment 2 into a signal close to a DC voltage. For example, the signal processing unit 108 may perform signal processing of applying a fixed offset (such as, for example, 5V in the case of voltage) on the sound signal acquired from the electronic equipment 2. Further, the signal processing unit 108 may perform signal processing of outputting a DC signal when full output of the sound signal or output in a specific frequency band of the sound signal exceeds a predetermined threshold, and may convert the sound signal into a DC signal. In such a case, the signal processing unit 108 may further change time for outputting the DC signal according to a degree of how much the output of the sound signal exceeds the threshold.

Further, for example, because the voice coil motor and the piezo actuator are vibration actuators which cause vibration in a wide band, there is a case where caused vibration may cause unintended sound according to materials or shapes of the gripped portion 12. Therefore, when the vibrating unit 14 is a voice coil motor or a piezo actuator, the signal processing unit 108 may perform signal processing of reducing a signal of a predetermined frequency band on the sound signal acquired from the electronic equipment 2. For example, the signal processing unit 108 may perform signal processing of reducing a signal of a frequency band (for example, 200 Hz or higher) corresponding to formant of the human voice on the sound signal acquired from the electronic equipment 2.

Further, in addition to the above-described signal processing, the signal processing unit 108 may perform signal processing of removing characteristic change (for example, output acceleration with respect to the input signal) caused by a frequency of the vibration actuator on the sound signal acquired from the electronic equipment 2, or may perform signal processing of preventing an oscillator from oscillating around a resonant frequency of the vibration actuator.

The input operating unit 110 is an input apparatus for the operator 3 to operate setting of the vibrating apparatus 1A. Specifically, the input operating unit 110 receives input of selection of setting to the signal processing unit 108 and the output control unit 106 from the operator 3. For example, the input operating unit 110 may be configured with an input mechanism such as a switch and a lever operated by the operator 3, an input control circuit which generates an input signal based on the input from the operator 3, or the like.

According to the above-described configuration, the vibrating apparatus 1A according to the first embodiment of the present disclosure can vibrate the gripped portion 12 by causing the vibrating unit 14 to vibrate based on the sound signal from the held electronic equipment 2 and transmit a favorable vibratory sense to the operator 3.

[2.2. Control Example of Vibrating Apparatus]

Figure 3:
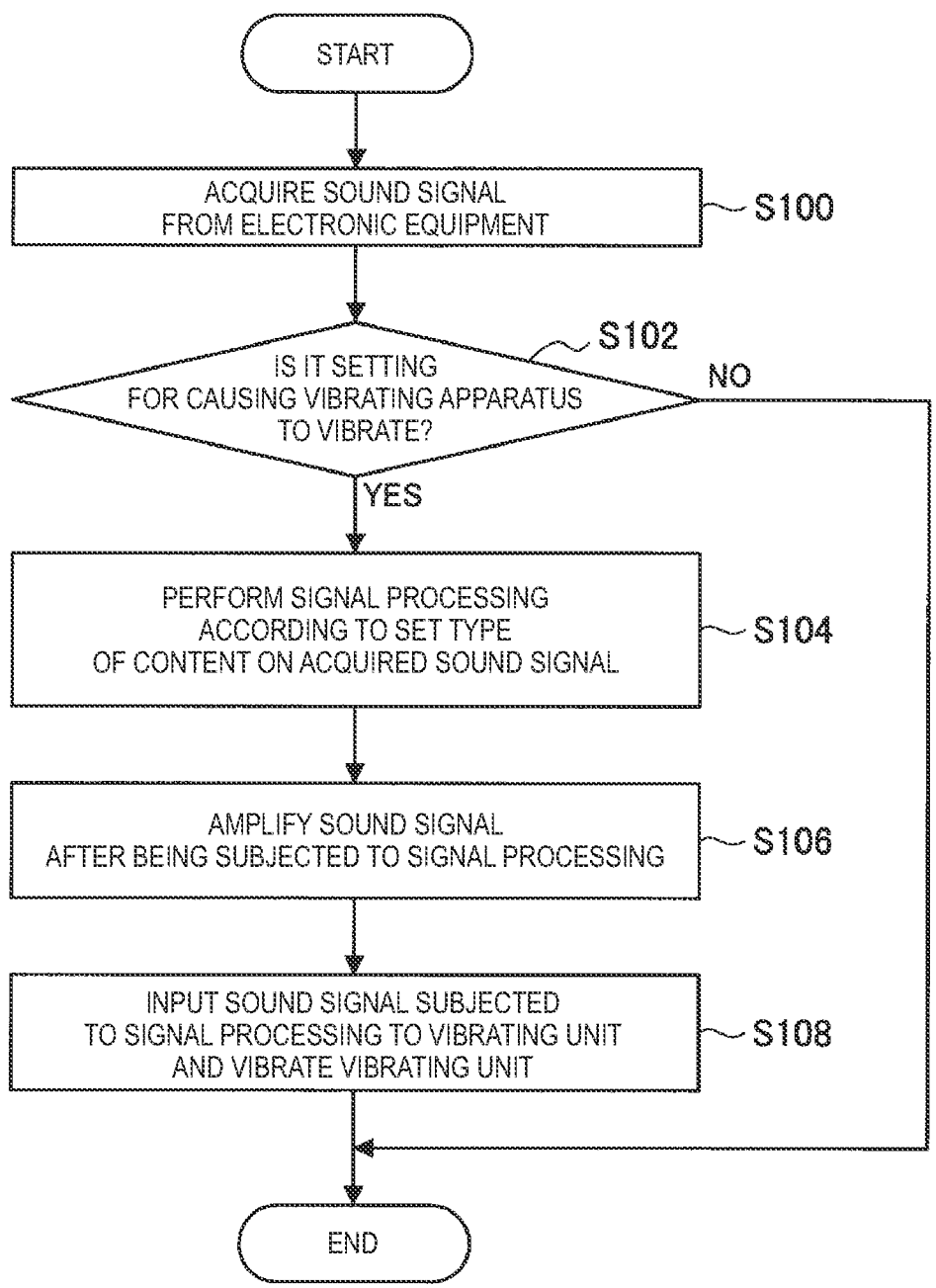
FIG. 3 is a flowchart illustrating a control example of vibration of the vibrating apparatus according to the first embodiment of the present disclosure.

Subsequently, a control example of the vibrating apparatus 1A according to the first embodiment of the present disclosure will be described with reference to FIG. 3. FIG. 3 is a flowchart illustrating a control example of vibration of the vibrating apparatus 1A according to the first embodiment of the present disclosure.

While, in the following description, the control example of the vibration of the vibrating apparatus 1A will be described, sound output of the vibrating apparatus 1A can be also controlled with substantially the same control example. Therefore, description of the control example of sound output of the vibrating apparatus 1A will be omitted here.

As illustrated in FIG. 3, first, the vibrating apparatus 1A acquires the sound signal from the held electronic equipment 2 through the sound input unit 102 (S100). Then, the output control unit 106 determines whether or not setting selected by the operator 3 through the input operating unit 110 is setting for causing the vibrating apparatus 1A to vibrate (S102). When the setting selected by the operator 3 through the input operating unit 110 is not setting for causing the vibrating apparatus 1A to vibrate (S102/No), the vibrating apparatus 1A finishes operation.

On the other hand, when the setting selected by the operator 3 through the input operating unit 110 is setting for causing the vibrating apparatus 1A to vibrate (S102/Yes), the signal processing unit 108 performs signal processing according to the set type of content on the acquired sound signal (S104). Subsequently, after the sound signal is amplified by the amplifier circuit, or the like (S106), the sound signal is input to the vibrating unit 14, and the vibrating unit 14 vibrates (S108). By this means, the vibrating apparatus 1A can vibrate the gripped portion 12 based on the sound signal acquired from the electronic equipment 2.

[2.3. Appearance Example of Vibrating Apparatus]

Figure 4A:
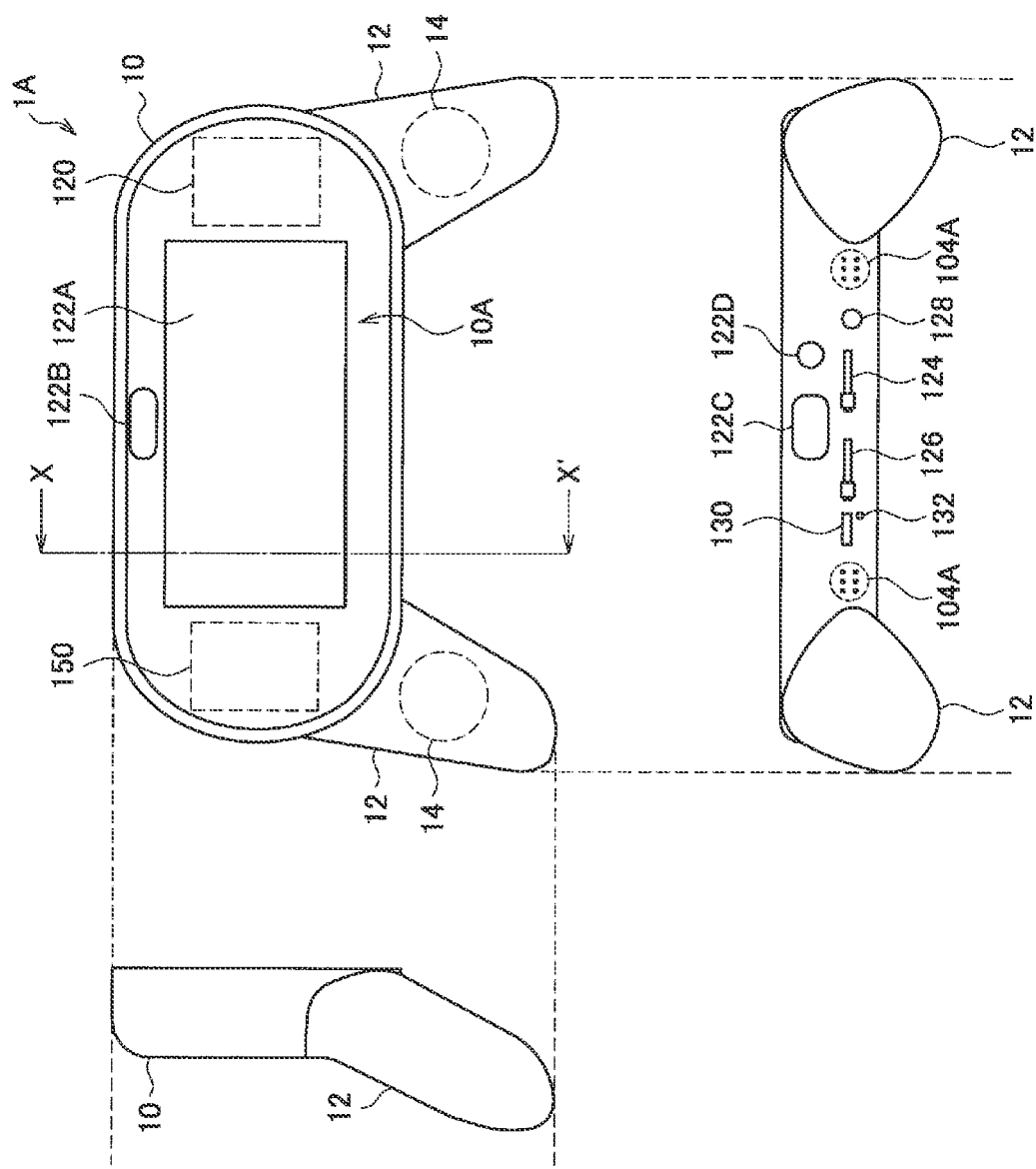
FIG. 4A is a plan view illustrating an appearance example of the vibrating apparatus according to the first embodiment of the present disclosure.

A specific appearance example of the vibrating apparatus 1A according to the first embodiment of the present disclosure will be described next with reference to FIGS. 4A, 4B, 4C, 5A and 5B. FIG. 4A is a plan view illustrating an appearance example of the vibrating apparatus 1A according to the first embodiment of the present disclosure, FIG. 4B is a cross-sectional view of an X-X' plane of the vibrating apparatus 1A illustrated in FIG. 4A, and FIG. 4C is a rear view of the vibrating apparatus 1A illustrated in FIG. 4A.

Figure 4B:
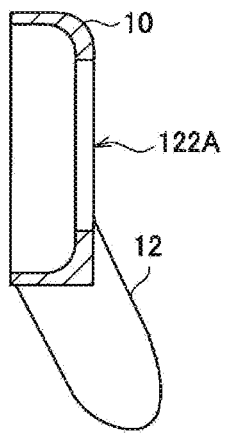
FIG. 4B is a cross-sectional view of an I-I' plane of the vibrating apparatus illustrated in FIG. 4A.
Figure 4C:
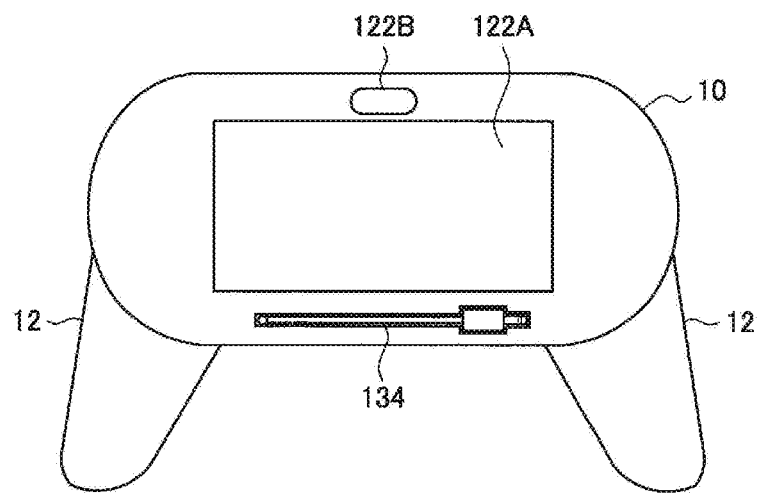
FIG. 4C is a rear view of the vibrating apparatus illustrated in FIG. 4A.

As illustrated in FIGS. 4A, 4B, and 4C, the vibrating apparatus 1A according to the first embodiment of the present disclosure includes two gripped portions 12 projecting from a side face of the equipment holding unit 10, and vibrating units 14 are respectively provided at the gripped portions 12.

The equipment holding unit 10 has a structure for holding the electronic equipment 2. Specifically, the equipment holding unit 10 has a concave portion 10A which matches the shape of the electronic equipment 2 to be held, and holds the electronic equipment 2 by the electronic equipment 2 being fitted into the concave portion 10A. Further, a claw portion which becomes a catch for fixing the electronic equipment may be provided at an end portion of the concave portion 10A of the equipment holding unit 10.

Further, opening portions 122A, 122A, 122C and 122D may be provided at the equipment holding unit 10 so that a camera, a connector, a touch pad, or the like, of the electronic equipment 2 are not covered. For example, in the vibrating apparatus 1A illustrated in FIG. 4A, the opening portion 122A is an opening portion for a rear touch pad of the electronic equipment 2, the opening portion 122B is an opening portion for a camera of the electronic equipment 2, the opening portion 122C is an opening portion for a charging connector of the electronic equipment 2, and the opening portion 122D is an opening portion for a stereo mini jack of the electronic equipment 2.

Note that various shapes can be employed as the shape of the equipment holding unit 10 and the shape of the opening portion provided at the equipment holding unit 10 according to the electronic equipment 2 to be held at the equipment holding unit 10.

The two gripped portions 12 are provided to project from the side face of the equipment holding unit 10 so as to allow the operator 3 to grip the gripped portions 12 with the right and left hands. Further, the vibrating units 14 are respectively incorporated into the gripped portions 12. However, the vibrating units 14 do not have to be incorporated into the gripped portions 12 if the vibrating units 14 can vibrate the gripped portions 12, and it goes without saying that it is only necessary to provide at least one or more vibrating units 14.

The vibrating unit 14 is, for example, a voice coil motor, a piezo actuator or an eccentric motor. Further, the vibrating units 14 incorporated into the right and left gripped portions 12 may be the same type of vibration actuator or different types of vibration actuators. Specifically, one of the vibrating units 14 incorporated into the right and left gripped portions 12 is preferably a voice coil motor or a piezo actuator which can cause vibration in a wide band, while the other is an eccentric motor which can cause strong vibration. Further, a plurality of vibrating units 14 may be provided at one gripped portion 12, and the provided plurality of vibrating units 14 may be different types of vibration actuators.

As will be described later, the vibrating apparatus 1A illustrated in FIGS. 4A, 4B, and 4C is connected to the electronic equipment 2 using a stereo mini plug 134, and acquires a stereo sound signal as a sound signal. Therefore, the vibrating unit 14 incorporated into the left gripped portion 12 preferably vibrates based on an L sound signal of the stereo sound signal, while the vibrating unit 14 incorporated into the right gripped portion 12 preferably vibrates based on an R sound signal of the stereo sound signal. According to this configuration, by the right and left vibrating units 14 respectively vibrating according to the R and L sound signals of the stereo sound signal, it is possible to transmit a vibratory sense as if, for example, vibration moved rightward and leftward to the operator 3.

Further, when the vibrating apparatus 1A acquires a monaural sound signal as sound vibration from the electronic equipment 2, the vibrating units 14 incorporated into the right and left gripped portions 12 may vibrate based on the same monaural sound signal. Still further, when the vibrating apparatus 1A acquires a multichannel sound signal such as 5.1 ch as a sound signal from the electronic equipment 2, the vibrating apparatus 1A may include vibrating units 14 corresponding to the number of channels of the acquired sound signal and cause each vibrating unit 14 to vibrate based on a sound signal of each channel.

Further, the vibrating apparatus 1A may cause the vibrating units 14 to vibrate with sound signals having different frequency components by separating the acquired sound signal into frequency components and assigning the respective vibrating units 14 to the respective frequency components.

Inside the equipment holding unit 10, a control substrate 120 and an electric storage unit 150 are provided. The control substrate 120 includes, for example, a DSP circuit, an amplifier circuit, a central processing unit (CPU), a read only memory (ROM), a random access memory (RAM), or the like. Here, the DSP circuit implements a function of performing signal processing on the sound signal, and the amplifier circuit implements a function of amplifying the sound signal. Further, the CPU functions as arithmetic processing unit and a control apparatus, the ROM stores a program and an operation parameter used by the CPU, and the RAM temporarily stores a program used during execution of the CPU, a parameter which changes as appropriate during the execution, or the like.

The electric storage unit 150 stores power required for activating the vibrating apparatus 1A. The electric storage unit 150 may be, for example, a secondary battery which allows discharge and charge. In such a case, the electric storage unit 150 can be charged by a cable through which power can be supplied being connected to a charging connector 130 at the bottom. Further, the vibrating apparatus 1A may include a battery lamp 132 and may notify the operator 3 of the remaining power amount of the electric storage unit 150 through brightness or color of the battery lamp 132.

Further, on one side of the equipment holding unit 10, a mode switching switch 124, an output switching switch 126, a stereo mini jack 128 and a sound output window 104A are provided.

The mode switching switch 124 is a switch for selecting signal processing to be applied to the sound signal according to the type of content at the signal processing unit 108. In the mode switching switch 124, for example, mode setting such as "Race", "FPS" and "Movie" is provided so as to be able to be selected. Further, the output switching switch 126 is a switch for selecting which of vibration and sound output is to be output at the vibrating unit 14 and the sound output unit 104. In the output switching switch 126, for example, output setting such as "vibration and sound off", "sound on" (that is, vibration off), "vibration on" (that is, sound off) and "vibration and sound on" is provided so as to be able to be selected.

Further, the output switching switch 126 may be an output adjustment slider which can adjust a degree of vibration and a volume of sound output at the vibrating unit 14 and the sound output unit 104 independently. According to this configuration, the operator 3 can arbitrarily adjust a degree of vibration and a volume of sound output according to an environment where the electronic equipment 2 is used.

The sound output window 104A is an opening portion through which sound converted and output by the sound output unit 104 passes. At the back of the sound output window 104A, a speaker which is the sound output unit 104 is provided. Further, the stereo mini jack 128 is a connection interface for further outputting the sound signal acquired from the electronic equipment 2 to an external sound output apparatus such as a headphone and an earphone. Note that, when the stereo mini plug is connected to the stereo mini jack 128, the vibrating apparatus 1A may detect connection of the stereo mini plug and automatically turn off the sound output of the sound output unit 104.

Further, as illustrated in FIG. 4C, on the back face of the vibrating apparatus 1A, a stereo mini plug 134 which is a connection interface for acquiring the sound signal from the electronic equipment 2 is provided. Further, the vibrating apparatus 1A may include a groove for storing the stereo mini plug 134 on the back face. By the stereo mini plug 134 being inserted into the stereo mini jack of the electronic equipment 2 through the opening portion 122D, the vibrating apparatus 1A can acquire the sound signal from the electronic equipment 2. Note that the vibrating apparatus 1A may automatically detect whether or not the stereo mini plug 134 is connected to the electronic equipment 2, and, when the stereo mini plug 134 is not connected to the electronic equipment 2, may stop power supply to the vibrating unit 14 and the sound output unit 104.

Figure 5A:
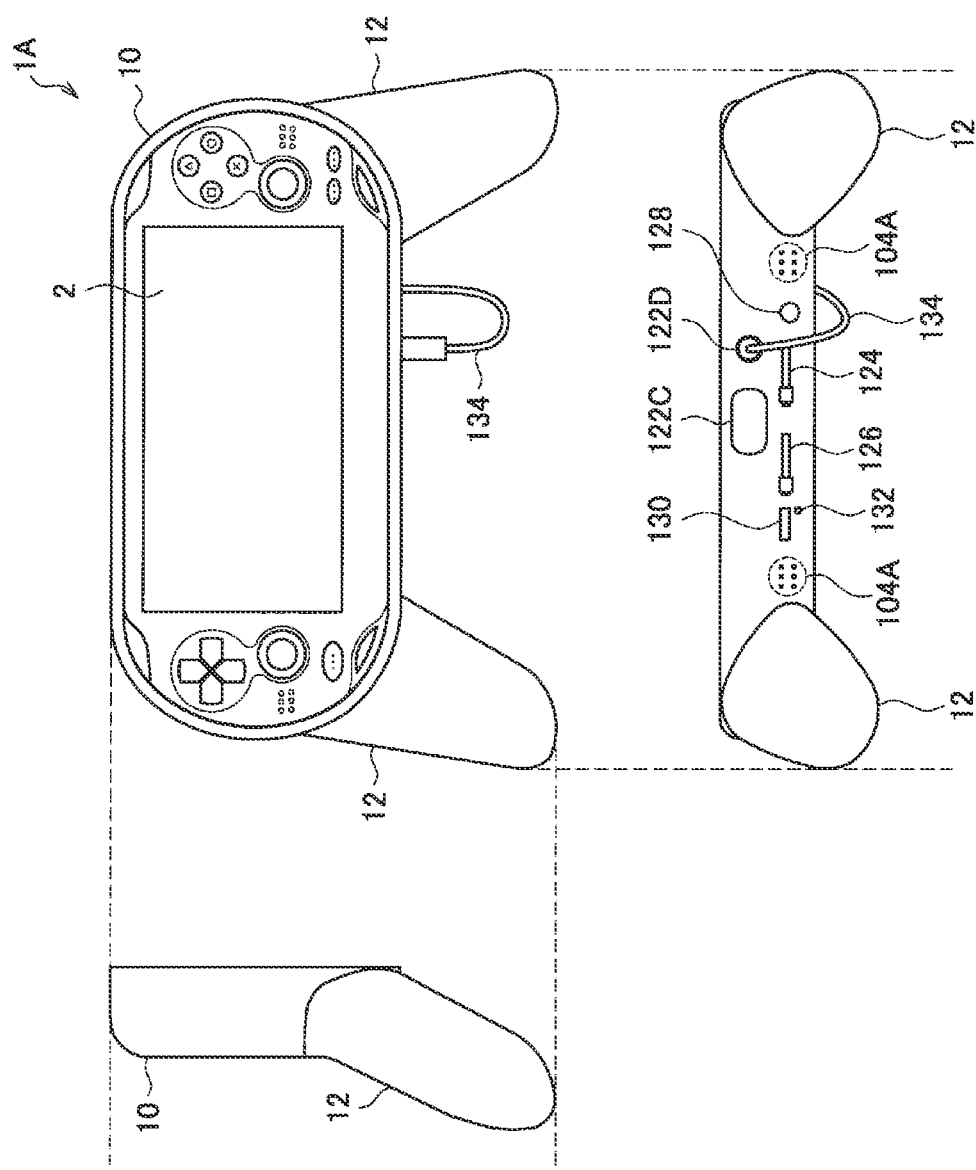
FIG. 5A is a plan view illustrating a form in which electronic equipment is loaded to the vibrating apparatus illustrated in FIG. 4A.
Figure 5B:
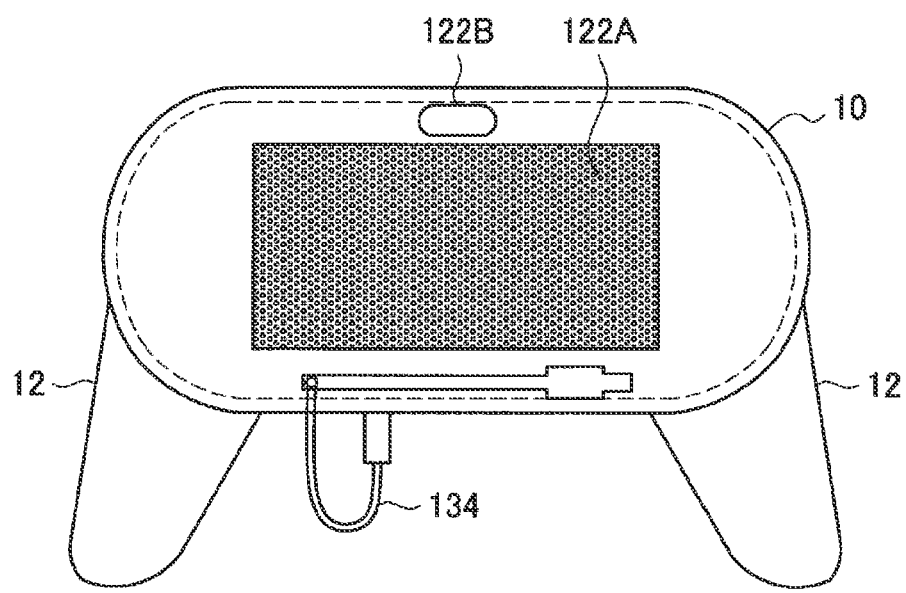
FIG. 5B is a rear view of the vibrating apparatus illustrated in FIG. 5A.

Here, FIGS. 5A and 5B illustrate forms in which the electronic equipment 2 is loaded to the vibrating apparatus 1A illustrated in FIGS. 4A, 4B, and 4C. FIG. 5A is a plan view illustrating a form in which the electronic equipment 2 is loaded to the vibrating apparatus 1A illustrated in FIG. 4A, and FIG. 5B is a rear view of the vibrating apparatus 1A illustrated in FIG. 5A.

As illustrated in FIG. 5A, by the electronic equipment 2 being fitted into the concave portion 10A of the equipment holding unit 10, the electronic equipment 2 is fixed and held at the vibrating apparatus 1A. Further, as illustrated in FIGS. 5A and 5B, by the stereo mini plug 134 provided on the back face of the vibrating apparatus 1A being inserted into the stereo mini jack of the electronic equipment 2 through the opening portion 122D, the vibrating apparatus 1A is connected to the electronic equipment 2.

The vibrating apparatus 1A according to the first embodiment of the present disclosure has been described above. According to the vibrating apparatus 1A according to the first embodiment of the present disclosure, by the vibrating unit 14 vibrating the gripped portion 12 gripped by the operator 3 with the whole flat of the hand, it is possible to efficiently transmit a vibratory sense to the operator 3.

Further, because the vibrating apparatus 1A according to the first embodiment of the present disclosure causes the vibrating unit 14 to vibrate based on the sound signal from the electronic equipment 2, even when content does not send a signal dedicated for causing the vibrating apparatus 1 to vibrate, it is possible to transmit a vibratory sense to the operator 3. Still further, because the vibrating apparatus 1A according to the first embodiment of the present disclosure can control vibration and sound output independently, it is possible to arbitrarily control vibration and sound output according to an environment where the electronic equipment 2 is used.

Note that description has been provided assuming that, at the vibrating apparatus 1A according to the first embodiment of the present disclosure, the vibrating unit 14 vibrates based on the sound signal acquired from the electronic equipment 2. According to this configuration, the vibrating apparatus 1A can cause the vibrating unit 14 to vibrate without changing content to be executed at the electronic equipment 2 and can transmit a vibratory sense to the operator 3. However, the technology according to the present disclosure is not limited to this configuration. The vibrating apparatus 1A according to the first embodiment of the present disclosure may cause the vibrating unit 14 to vibrate based on a signal instructing the vibrating unit 14 to vibrate generated inside the electronic equipment 2.

For example, when the electronic equipment 2 executes content such as race game, and the vibrating apparatus 1A causes the vibrating unit 14 to vibrate based on the sound signal from the electronic equipment 2, driving sound is always transmitted to the operator 3 as vibration. Therefore, there is a possibility that the hand of the operator 3 may go numb by the constant vibration of the vibrating apparatus 1A. Further, when the electronic equipment 2 executes content such as movie, and the vibrating apparatus 1A causes the vibrating unit 14 to vibrate based on the sound signal such as human voice which does not originally have vibration components, there is a possibility that the operator 3 may feel a sense of discomfort with respect to the vibration.

Therefore, the electronic equipment 2 may generate a signal instructing the vibrating apparatus 1A to vibrate separately from the sound signal inside the electronic equipment 2. Alternatively, the content to be executed at the electronic equipment 2 may have a signal instructing the vibrating apparatus 1A to vibrate separately. The vibrating apparatus 1A can vibrate based on this signal instructing the vibrating apparatus 1A to vibrate.

For example, when the vibrating apparatus 1A and the electronic equipment 2 are connected at the stereo mini jack 134 and input/output stereo sound signals, the electronic equipment 2 may output a normal sound signal as an L-side sound signal and convert a signal as an R-side sound signal, which instructs the vibrating unit 14 to vibrate into a sound waveform and output the sound waveform. In such a case, the vibrating apparatus 1A can output sound from the sound output unit 104 based on the L-side sound signal which is the normal sound signal and cause the vibrating unit 14 to vibrate based on the R-side sound signal which is the signal instructing the vibrating unit 14 to vibrate.

At this time, content to be executed at the electronic equipment 2 has a normal stereo signal (an L-side sound signal and an R-side sound signal) in the case where the vibrating apparatus 1A is not used and a stereo sound signal (an L-side sound signal and an R-side vibration signal) in the case where the vibrating apparatus 1A is used. Note that, in the above description, the vibrating apparatus 1A only has to have one vibrating unit 14 and one sound output unit 104.

Further, the electronic equipment 2 may divide a signal to be output to the vibrating apparatus 1A in a frequency band, superimpose the sound signal on the signal instructing the vibrating apparatus 1A to vibrate and output the superimposed signal to the vibrating apparatus 1A. For example, the electronic equipment 2 may output a sound signal obtained by superimposing the sound signal of 200 Hz or higher on the signal of lower than 200 Hz, instructing the vibrating apparatus 1A to vibrate to the vibrating apparatus 1A as a stereo sound signal. In such a case, the vibrating apparatus 1A separates the signal acquired from the electronic equipment 2 into the signal of 200 Hz or higher and the signal of lower than 200 Hz, instructing the vibrating apparatus 1A to vibrate and activates the sound output unit 104 and the vibrating unit 14 based on the respective signals. According to this configuration, the electronic equipment 2 can output the sound signal and the signal instructing the vibrating apparatus 1A to vibrate to the vibrating apparatus 1A as stereo signals respectively including the L-side signal and the R-side signal. Therefore, when the vibrating apparatus 1A includes, for example, the sound output unit 104 and the vibrating unit 14 respectively at the left side and the right side, it is possible to activate the sound output unit 104 and the vibrating unit 14 at the left side using the L-side signal and activate the sound output unit 104 and the vibrating unit 14 at the right side using the R-side signal.

Note that whether the electronic equipment 2 outputs only the sound signal or outputs both the sound signal and the signal instructing the vibrating apparatus 1A to vibrate can be switched through input by the operator 3. Further, whether the electronic equipment 2 outputs only the sound signal or outputs both the sound signal and the signal instructing the vibrating apparatus 1A to vibrate can be switched by the electronic equipment 2 detecting that the vibrating apparatus 1A is connected to the electronic equipment 2.

3. SECOND EMBODIMENT

Figure 6:
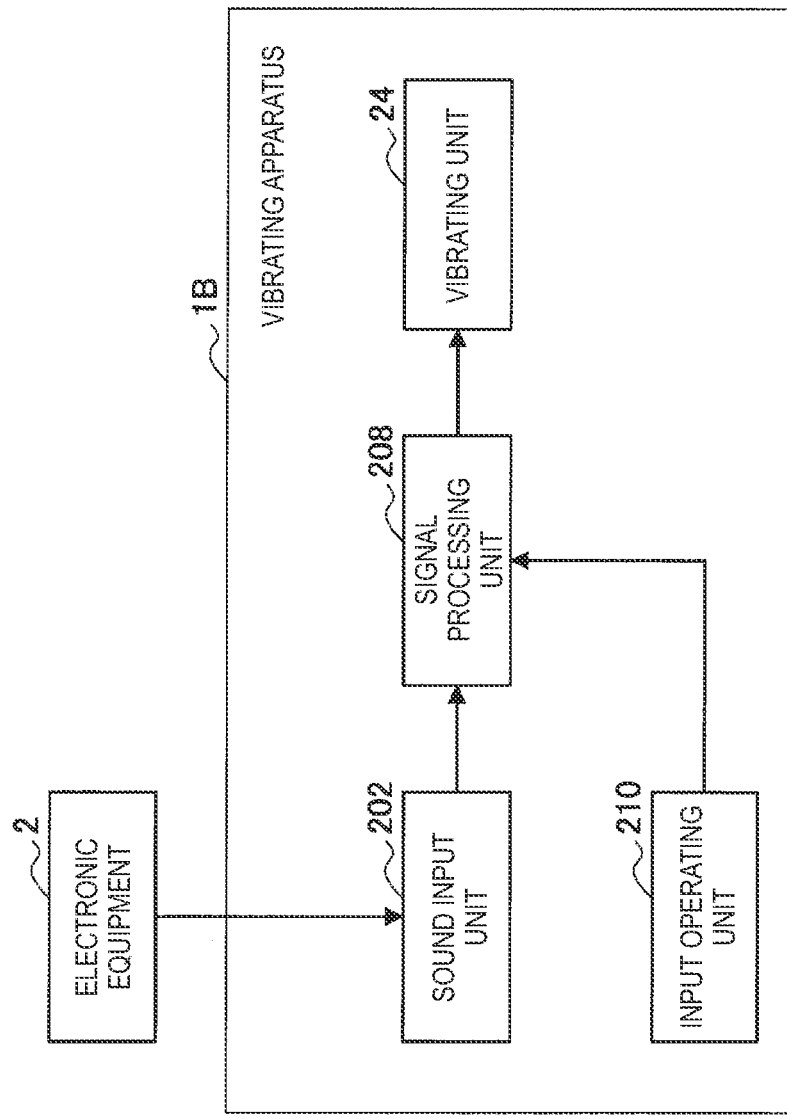
FIG. 6 is a block diagram illustrating a configuration of a vibrating apparatus according to a second embodiment of the present disclosure.

Subsequently, a vibrating apparatus 1B according to a second embodiment of the present disclosure will be described with reference to FIG. 6. The vibrating apparatus 1B according to the second embodiment of the present disclosure is an embodiment in which a separate sound output unit is not provided, and the vibrating unit 24 has a sound output function and vibrates and outputs sound based on the sound signal acquired from the electronic equipment 2.

[3.1. Configuration Example of Vibrating Apparatus]

A configuration of the vibrating apparatus 1B according to the second embodiment of the present disclosure will be described with reference to FIG. 6. FIG. 6 is a block diagram illustrating the configuration of the vibrating apparatus 1B according to the second embodiment of the present disclosure. As illustrated in FIG. 6, the vibrating apparatus 1B includes a sound input unit 202, a signal processing unit 208, a vibrating unit 24 and an input operating unit 210.

Here, because the sound input unit 202 is substantially the same as the sound input unit 102 described in the first embodiment, and the input operating unit 210 is substantially the same as the input operating unit 110, description will be omitted here.

The vibrating unit 24 is a vibration actuator having a vibration function and a sound output function. Specifically, the vibrating unit 24 vibrates the gripped portion of the vibrating apparatus 1B and outputs the sound by vibrating based on the sound signal acquired from the electronic equipment 2. For example, the vibrating unit 24 may be a voice coil motor, a piezo actuator, or the like, which can cause vibration in a wide band and which can output sound by a member vibrating in an audible range. Further, the vibrating unit 24 may vibrate the gripped portion using vibration caused when sound is output from a speaker, or the like.

The signal processing unit 208, which is, for example, a DSP circuit, performs signal processing on the sound signal acquired from the electronic equipment 2. Specifically, the signal processing unit 208 has substantially the same function as that of the signal processing unit 108 in the first embodiment, and further has a function of controlling whether or not to perform vibration at the vibrating unit 24 and output sound. In the following description, the function of controlling vibration at the vibrating unit 24 and sound output, of the signal processing unit 208 in the second embodiment will be described.

Specifically, the signal processing unit 208 performs signal processing of reducing a signal of a predetermined frequency band on the sound signal acquired from the electronic equipment 2 based on selection of setting of "vibration and sound off", "sound on" (that is, vibration off), "vibration on" (that is, sound off) and "vibration and sound on" selected by the operator 3 through the input operating unit 210.

For example, when the setting is "vibration on" (that is, sound off), the signal processing unit 208 may perform signal processing of reducing a signal of a high frequency band (for example, 200 Hz or higher) corresponding to formant of the human voice on the sound signal acquired from the electronic equipment 2. In such a case, the vibrating unit 24 can cause only vibration which transmits a vibratory sense to the operator 3 while sound output is suppressed.

Further, when the setting is "sound on" (that is, vibration off), the signal processing unit 208 may perform signal processing of reducing a signal of a low frequency band (for example, 200 Hz or lower) on the sound signal acquired from the electronic equipment 2. In such a case, the vibrating unit 24 can output only sound while vibration transmitting a vibratory sense to the operator 3 is suppressed.

According to the above-described configuration, because the vibrating unit 24 has a sound output function, the vibrating apparatus 1B according to the second embodiment of the present disclosure can omit a sound output unit. By this means, it is possible to simplify the structure of the vibrating apparatus 1B according to the second embodiment of the present disclosure. Further, because space inside the vibrating apparatus 1B can be secured as a result of the sound output unit being omitted, the vibrating apparatus 1B can further increase, for example, capacity of the electric storage unit.

4. THIRD EMBODIMENT

A vibrating apparatus 1C according to a third embodiment of the present disclosure will be described next with reference to FIGS. 7A, 7B, 7C, and 8. The vibrating apparatus 1C according to the third embodiment of the present disclosure is an embodiment in which the gripped portion 32 is connected to the equipment holding unit 30 so as to be able to change a projecting direction, and vibration of the vibrating unit 34 is controlled based on the projecting direction of the gripped portion with respect to the equipment holding unit 30.

[4.1. Appearance Example of Vibrating Apparatus]

Figure 7C:
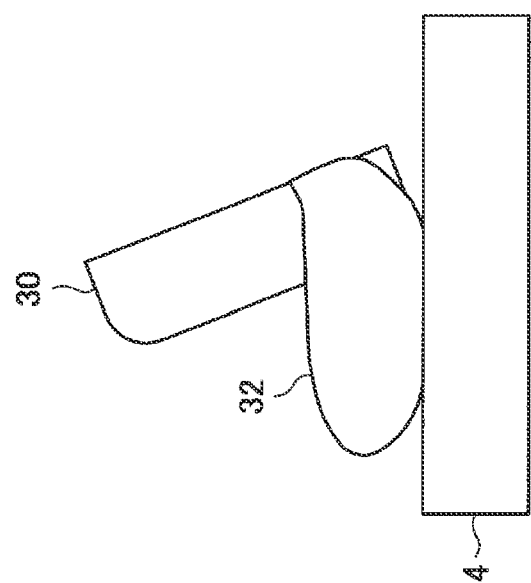
FIGS. 7A, 7B, and 7C are side views illustrating an appearance example of a vibrating apparatus according to a third embodiment of the present disclosure.
Figure 7B:
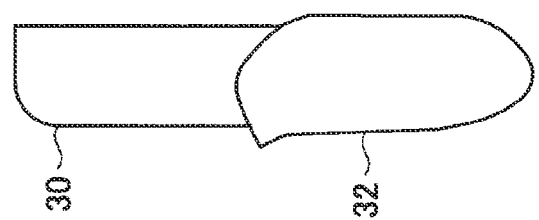
Figure 7A:
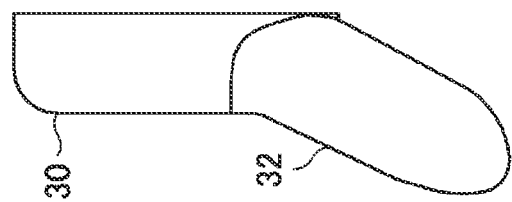

First, an appearance example of the vibrating apparatus 1C according to the third embodiment of the present disclosure will be described with reference to FIGS. 7A, 7B, and 7C. FIGS. 7A, 7B, and 7C are side views illustrating the appearance example of the vibrating apparatus 1C according to the third embodiment of the present disclosure.

As illustrated in FIGS. 7A, 7B, and 7C, in the vibrating apparatus 1C according to the third embodiment of the present disclosure, the gripped portion 32 is connected so as to be able to change the projecting direction with respect to the equipment holding unit 30. Specifically, the gripped portion 32 can swing around a connection point with the equipment holding unit 30 in a direction perpendicular to a face where the electronic equipment 2 is held at the equipment holding unit 30.

For example, as illustrated in FIG. 7A, in a normal usage state of the vibrating apparatus 1C, the gripped portion 32 may project in a direction inclined to a back face side from the face of the equipment holding unit 30 where the electronic equipment 2 is held. Further, as illustrated in FIG. 7B, in a non-usage state of the vibrating apparatus 1C, the gripped portion 32 may project in a direction on the same plane as the face of the equipment holding unit 30 where the electronic equipment 2 is held.

According to this configuration, because the vibrating apparatus 1C can swing the gripped portion 32 so as to be located on the same plane as the equipment holding unit 30 in a non-usage state, it is possible to make the gripped portion 32 projecting on the back face side of the equipment holding unit 30 less bulky when the gripped portion 32 is stored in the normal usage state.

Further, as illustrated in FIG. 7C, the gripped portion 32 may be swung at an angle the projecting direction forms an acute angle with the equipment holding unit 30 on the back face side of the face of the equipment holding unit 30 where the electronic equipment 2 is held. According to this configuration, the vibrating apparatus 1C functions as a stand which supports the held electronic equipment 2, and the operator 3 can view the electronic equipment 2 in a state where the electronic equipment 2 is placed on a desk 4, or the like. Therefore, with the vibrating apparatus 1C, when the operator 3 views content such as a moving image with the electronic equipment 2, the electronic equipment 2 can be placed on the desk 4 at an angle at which the operator 3 can easily view the content.

Further, the vibrating apparatus 1C according to the third embodiment of the present disclosure can control vibration of the vibrating unit 34 based on the projecting direction of the gripped portion 32 with respect to the equipment holding unit 30. Specifically, the vibrating apparatus 1C according to the third embodiment of the present disclosure detects a case where the vibrating apparatus 1C is put into a non-usage state as illustrated in FIG. 7B, and a case where the vibrating apparatus 1C is used as a stand as illustrated in FIG. 7C based on the projecting direction of the gripped portion 32 with respect to the equipment holding unit 30. In such a case, the vibrating apparatus 1C performs control of stopping the vibration function of the vibrating unit 34 and automatically prevents vibration of the vibrating unit 34 in a state where vibration of the gripped portion 32 is not required.

Note that the vibrating apparatus 1C according to the third embodiment of the present disclosure may stop functions of the whole vibrating apparatus 1C when it is detected that the vibrating apparatus 1C is put into a non-usage state.

Further, the vibrating apparatus 1C according to the third embodiment of the present disclosure may further include a touch sensor at the gripped portion 32, and may perform control of stopping the vibration function of the vibrating unit 34 based on whether or not the gripped portion 32 is gripped by the operator 3, detected by the touch sensor. According to this configuration, when the operator 3 temporarily puts the vibrating apparatus 1C on a desk, or the like, it is possible to prevent occurrence of contact noise between the vibrating apparatus 1C and the desk 4 by vibration or prevent the vibrating apparatus 1C from moving by vibration. Note that the touch sensor placed on the gripped portion 32 can include, for example, a capacitance type touch sensor, a pressure sensor, a button depressed by the operator 3 gripping the gripped portion 32, or the like.

Further, when the vibrating apparatus 1C includes a plurality of gripped portions 32, touch sensors may be provided at at least one or more gripped portions 32. In such a case, the vibrating apparatus 1C may stop only vibration of the vibrating unit 34 provided at the gripped portion 32 for which it is detected that the state is a non-contact state by the touch sensor or may stop vibration of the vibrating units 34 provided at all the gripped portions 32.

Further, the vibrating apparatus 1C according to the third embodiment of the present disclosure may perform control of stopping the vibration function of the vibrating unit 34 based on information acquired at a motion sensor (such as, for example, an acceleration sensor) provided at at least one of the vibrating apparatus 1C and the electronic equipment 2. Specifically, the vibrating apparatus 1C determines a state of the vibrating apparatus 1C by the motion sensor (such as, for example, the acceleration sensor), and, when the vibrating apparatus 1C is placed on a fixed object such as a desk, the vibrating apparatus 1C may perform control of stopping the vibration function of the vibrating unit 34. According to this configuration, in the vibrating apparatus 1C, in a similar manner, when the operator 3 temporarily puts the vibrating apparatus 1C on the desk, or the like, it is possible to prevent occurrence of contact noise between the vibrating apparatus 1C and the desk 4 by vibration or prevent the vibrating apparatus 1C from moving by vibration. Alternatively, the vibrating apparatus 1C may perform control of stopping the vibration function of the vibrating unit 34 based on information acquired at a camera provided on a surface or a back face of the vibrating apparatus 1C or various kinds of sensors such as a luminance sensor and a capacitive sensor in place of the motion sensor.

[4.2. Configuration Example of Vibrating Apparatus]

Figure 8:
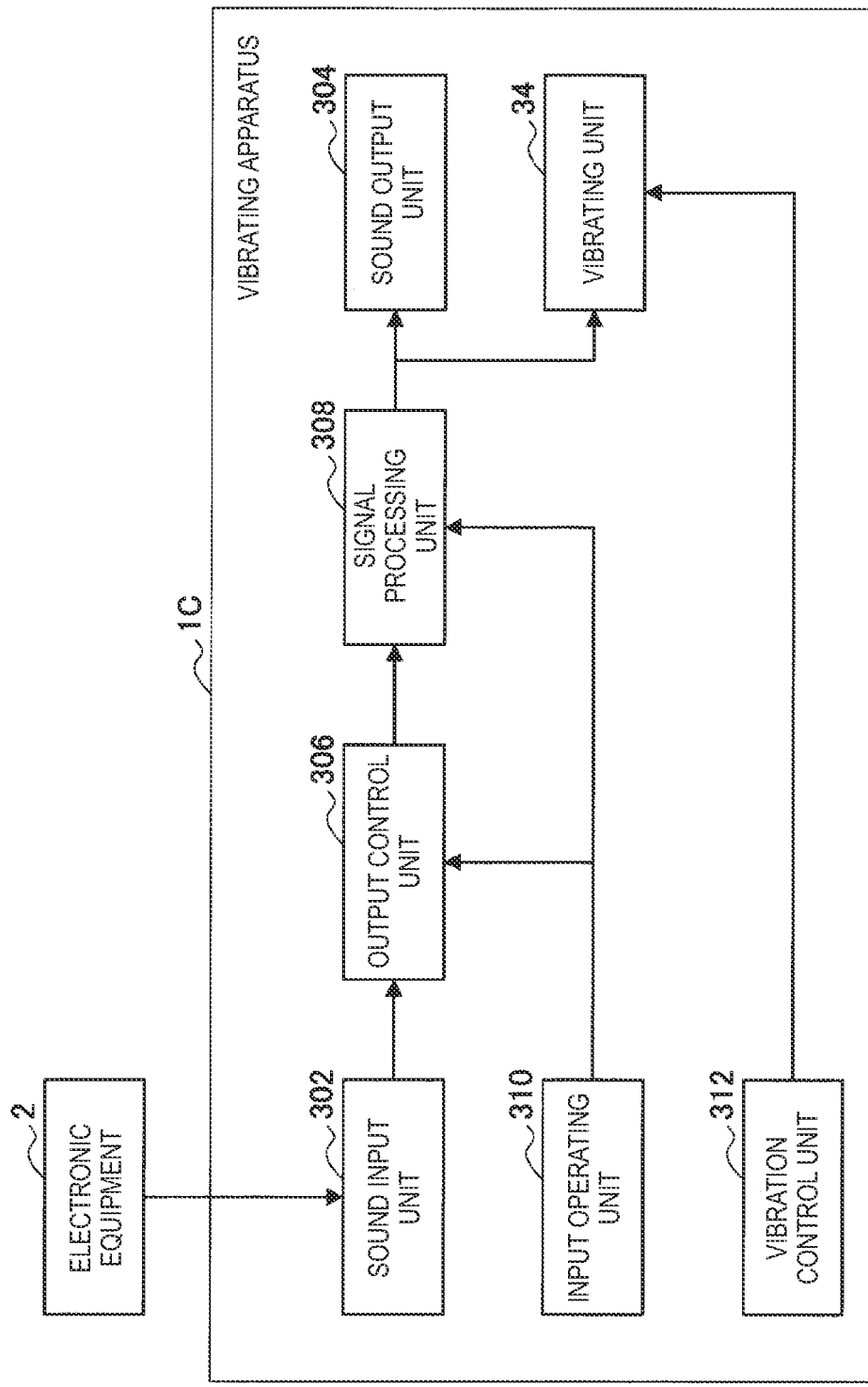
FIG. 8 is a block diagram illustrating a configuration of the vibrating apparatus according to the third embodiment of the present disclosure.

A configuration of the vibrating apparatus 1C according to the third embodiment of the present disclosure will be described next with reference to FIG. 8. FIG. 8 is a block diagram illustrating the configuration of the vibrating apparatus 1C according to the third embodiment of the present disclosure.

As illustrated in FIGS. 7A, 7B, and 7C, the vibrating apparatus 1C includes a sound input unit 302, a sound output unit 304, an output control unit 306, a signal processing unit 308, a vibrating unit 34, an input operating unit 310 and a vibration control unit 312.

Here, because the sound input unit 302 is substantially the same as the sound input unit 102 described in the first embodiment, the sound output unit 304 is substantially the same as the sound output unit 104, the output control unit 306 is substantially the same as the output control unit 106, the signal processing unit 308 is substantially the same as the signal processing unit 108, the vibrating unit 34 is substantially the same as the vibrating unit 14, and the input operating unit 310 is substantially the same as the input operating unit 110, description will be omitted here.

The vibration control unit 312 controls vibration of the vibrating unit 34 based on a projecting direction of the gripped portion 32 with respect to the equipment holding unit 30. Specifically, the vibration control unit 312 detects the projecting direction of the gripped portion 32 with respect to the equipment holding unit 30 using a contact switch, or the like, and, when the gripped portion 32 is a predetermined projecting direction, stops vibration of the vibrating unit 34. Here, the predetermined projecting direction is, for example, a projecting direction for which it is determined that the vibrating apparatus 1C is not used or not gripped as illustrated in FIG. 7B and FIG. 7C.

Further, the vibration control unit 312 controls vibration of the vibrating unit 34 based on a state where the operator 3 contacts the gripped portion 32, detected by a touch sensor provided at the gripped portion 32. Specifically, the vibration control unit 312 stops vibration of the vibrating unit 34 when it is detected by the touch sensor provided at the gripped portion 32 that the operator 3 does not grip the gripped portion 32. Note that, when it is detected that the operator 3 does not grip the gripped portion 32 at at least one or more gripped portions 32, the vibration control unit 312 may stop vibration of all the vibrating units 34 or may stop vibration of only the vibrating unit 34 at the gripped portion 32 for which it is detected that the operator 3 does not grip the gripped portion 32.

According to the above-described configuration, when the vibrating apparatus 1C is separated from the hands of the operator 3 and it is not necessary to cause vibration, the vibrating apparatus 1C according to the third embodiment of the present disclosure can automatically stop vibration of the vibrating unit 34.

5. FOURTH EMBODIMENT

Subsequently, a vibrating apparatus 1D according to a fourth embodiment of the present disclosure will be described with reference to FIGS. 9, 10A, 10B, and 10C. The vibrating apparatus 1D according to the fourth embodiment of the present disclosure is an embodiment in which a power feeding unit configured to feed power to the electronic equipment 2 is provided, and the vibrating apparatus 1D can function as an extended battery of the electronic equipment 2.

[5.1. Configuration Example of Vibrating Apparatus]

Figure 9:
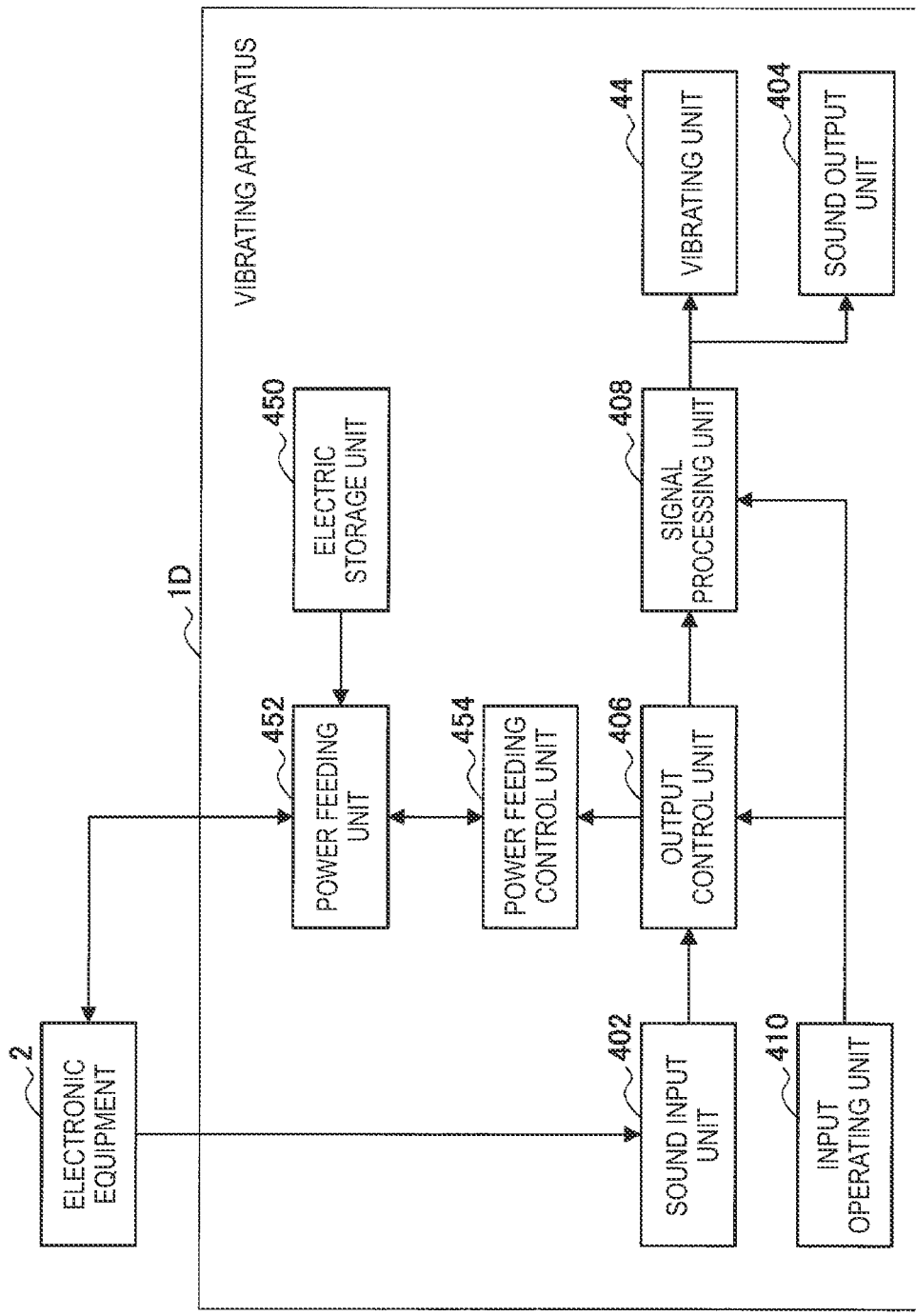
FIG. 9 is a block diagram illustrating a configuration of a vibrating apparatus according to a fourth embodiment of the present disclosure.

A configuration of the vibrating apparatus 1D according to the fourth embodiment of the present disclosure will be described with reference to FIG. 9. FIG. 9 is a block diagram illustrating the configuration of the vibrating apparatus 1D according to the fourth embodiment of the present disclosure. As illustrated in FIG. 9, the vibrating apparatus 1D includes a sound input unit 402, a sound output unit 404, an output control unit 406, a signal processing unit 408, a vibrating unit 44, an input operating unit 410, an electric storage unit 450, a power feeding unit 452 and a power feeding control unit 454.

Here, because the sound input unit 402 is substantially the same as the sound input unit 102 described in the first embodiment, the sound output unit 404 is substantially the same as the sound output unit 104, the output control unit 406 is substantially the same as the output control unit 106, the signal processing unit 408 is substantially the same as the signal processing unit 108, the vibrating unit 44 is substantially the same as the vibrating unit 14, and the input operating unit 410 is substantially the same as the input operating unit 110, description will be omitted here.

The electric storage unit 450 is a battery which can store power. Specifically, the electric storage unit 450 is a secondary battery which is incorporated into the vibrating apparatus 1D and which can perform charging. For example, the electric storage unit 450 may be a lithium-ion secondary battery. Power stored in the electric storage unit 450 is supplied to each component and circuit of the vibrating apparatus 1D and also further supplied to the electronic equipment 2 through the power feeding unit 452.

The power feeding unit 452 is an interface for supplying power to the electronic equipment 2. Specifically, the power feeding unit 452 may be a wired power feeding connector or power feeding cable, or may be a wireless power feeding interface using non-contact power transmission. According to this configuration, because the vibrating apparatus 1D can feed power to the electronic equipment 2, the vibrating apparatus 1D can function as an extended battery of the electronic equipment 2.

The power feeding control unit 454 controls power supply from the electric storage unit 450 to the electronic equipment 2. For example, the power feeding control unit 454 controls whether or not to feed power from the electric storage unit 450 to the electronic equipment 2 through input operation of the operator 3.

Further, the power feeding control unit 454 may measure an amount of power stored in the electric storage unit 450 and control whether or not to feed power from the electric storage unit 450 to the electronic equipment 2 based on the amount of power. Specifically, the power feeding control unit 454 may feed power from the electric storage unit 450 to the electronic equipment 2 until the power stored in the electric storage unit 450 becomes equal to or less than a threshold (for example, 50% of full charge) and may stop power feeding from the electric storage unit 450 to the electronic equipment 2 when the power stored in the electric storage unit 450 falls below the threshold. Still further, when the vibration and sound output of the vibrating unit 44 and the sound output unit 404 are turned off by the output control unit 406, the power feeding control unit 454 may feed power from the electric storage unit 450 to the electronic equipment 2 regardless of the above-described threshold.

Further, when the power feeding control unit 454 can acquire information of the amount of power stored in an electric storage unit of the electronic equipment 2, the power feeding control unit 454 may control whether or not to feed power so that the amount of power of the electric storage unit 450 of the vibrating apparatus 1D balances with the amount of power of the electric storage unit of the electronic equipment 2. Specifically, the power feeding control unit 454 may feed power to the electronic equipment 2 when the remaining power amount of the electric storage unit of the electronic equipment 2 is less than the remaining power amount of the electric storage unit 450 of the vibrating apparatus 1D, and may stop power feeding to the electronic equipment 2 when the remaining power amount of the electric storage unit of the electronic equipment 2 is equal to or larger than the remaining power amount of the electric storage unit 450 of the vibrating apparatus 1D.

For example, when usage of the both equipment is started in the state where both of the amount of power of the electric storage unit of the electronic equipment 2 and the remaining power amount of the electric storage unit 450 of the vibrating apparatus 1D is 100%, first, the power feeding control unit 454 does not feed power from the vibrating apparatus 1D to the electronic equipment 2. Then, when the remaining power amount of the electric storage unit of the electronic equipment 2 measured at a predetermined timing is less than the remaining power amount of the electric storage unit 450 of the vibrating apparatus 1D, the power feeding control unit 454 feeds power from the vibrating apparatus 1D to the electronic equipment 2. Further, when the remaining power amount of the electric storage unit of the electronic equipment 2 measured at a predetermined timing becomes equal to the remaining power amount of the electric storage unit of the vibrating apparatus 1D, the power feeding control unit 454 stops power feeding from the vibrating apparatus 1D to the electronic equipment 2. Note that, when the remaining power amount of the electronic equipment 2 measured at a predetermined timing is larger than the remaining power amount of the electric storage unit 450 of the vibrating apparatus 1D, the power feeding control unit 454 does not feed power from the vibrating apparatus 1D to the electronic equipment 2.

According to this configuration, because the power feeding control unit 454 can control power feeding from the vibrating apparatus 1D to the electronic equipment 2, it is possible to avoid a state where there remains a large amount of power in one of the electronic equipment 2 and the vibrating apparatus 1D while there remains little amount of power in the other.

[5.2. Appearance Example of Vibrating Apparatus]

Figure 10A:
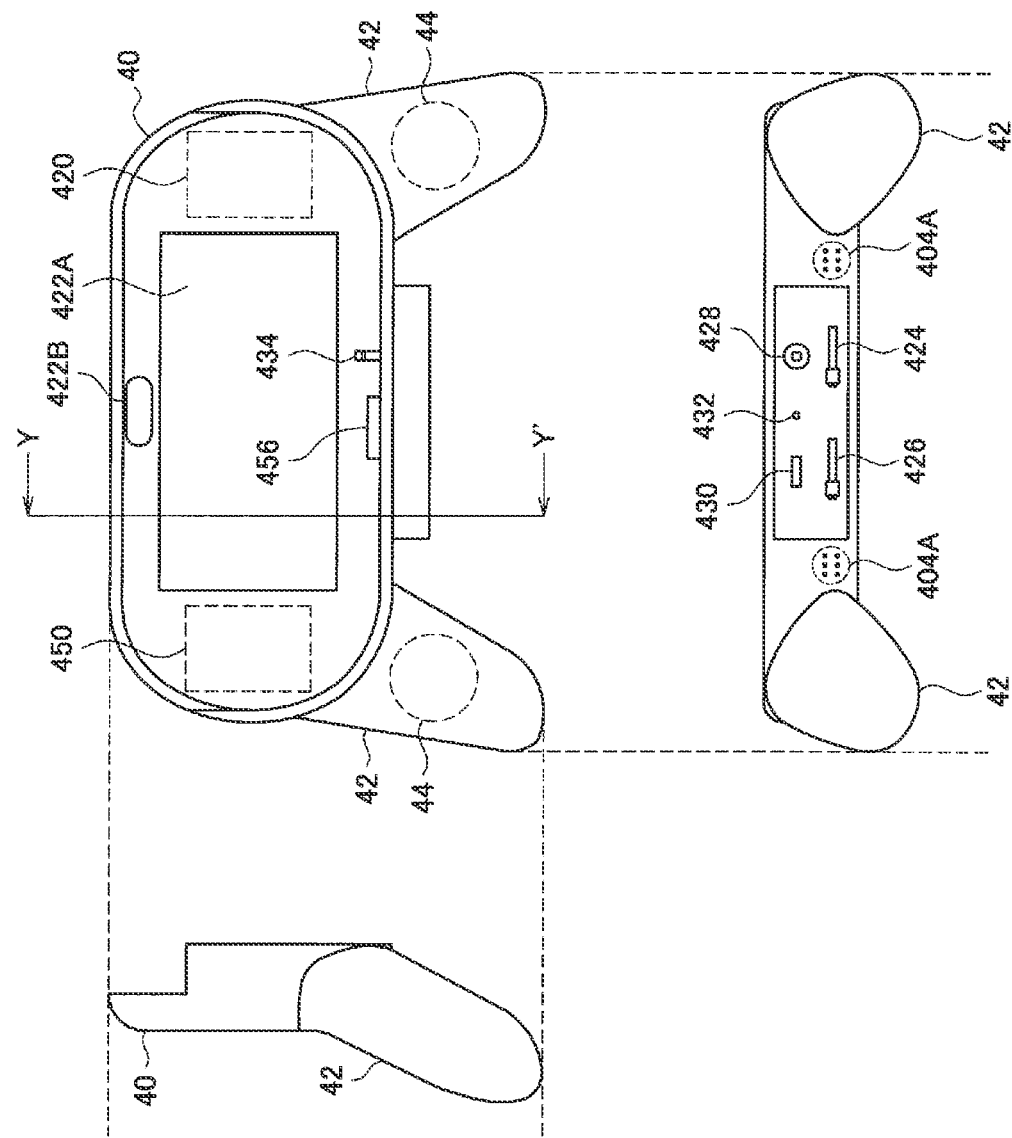
FIG. 10A is a plan view illustrating an appearance example of the vibrating apparatus according to the fourth embodiment of the present disclosure.

Subsequently, an appearance example of the vibrating apparatus 1D according to the fourth embodiment of the present disclosure will be described with reference to FIGS. 10A, 10B, and 10C. FIG. 10A is a plan view illustrating the appearance example of the vibrating apparatus 1D according to the fourth embodiment of the present disclosure, FIG. 10B is a cross-sectional view of a Y-Y' plane of the vibrating apparatus 1D illustrated in FIG. 10A, and FIG. 10C is a rear view of the vibrating apparatus 1D illustrated in FIG. 10A.

Figure 10B:
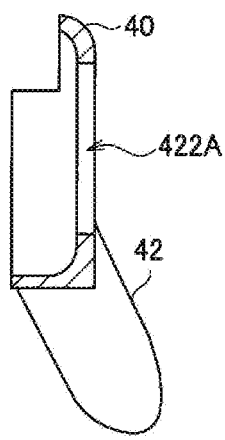
FIG. 10B is a cross-sectional view of a II-II' plane of the vibrating apparatus illustrated in FIG. 10A.
Figure 10C:
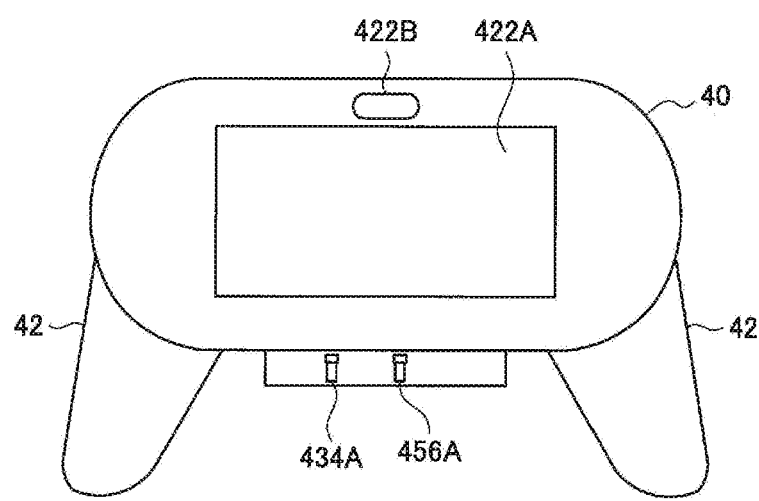
FIG. 10C is a rear view of the vibrating apparatus 1D illustrated in FIG. 10A.

As illustrated in FIGS. 10A, 10B, and 10C, the vibrating apparatus 1D according to the fourth embodiment of the present disclosure includes two gripped portions 42 projecting from the side face of the equipment holding unit 40, and vibrating units 44 are respectively provided at the gripped portions 42.

The equipment holding unit 40 has a structure for holding the electronic equipment 2, and has a structure in which a side face facing the side face on which the power feeding connector 456 and the stereo mini plug 434 are provided opens. The electronic equipment 2 is fitted with the equipment holding unit 40 through the opening on the side face of the equipment holding unit 40. Further, at the equipment holding unit 40, an opening portion 422A which is an opening portion for a touch pad on a back face of the electronic equipment 2 and an opening portion 122B which is an opening portion for a camera of the electronic equipment 2, are provided.

Note that, as with the first embodiment, it goes without saying that the shape of the equipment holding unit 40 and the shape of the opening portion provided at the equipment holding unit 40 can be variously modified according to the electronic equipment 2 held at the equipment holding unit 40.

The power feeding connector 456 is a connection interface for feeding power to the electronic equipment 2, and power is fed from the electric storage unit 450 to the electronic equipment 2 through the power feeding connector 456. Further, the stereo mini plug 434 is a connection interface for acquiring a sound signal from the electronic equipment 2, and the vibrating apparatus 1D acquires a sound signal from the electronic equipment 2 by the stereo mini plug 434 being inserted into the stereo mini jack of the electronic equipment 2.

Two gripped portions 42 are provided to project from the side face of the equipment holding unit 40 so as to be able to be gripped by the operator 3 with the right and left hands. Further, the vibrating units 44 are respectively incorporated into the gripped portions 42. Because the gripped portion 42 and the vibrating unit 44 are substantially the same as the gripped portion 12 and the vibrating unit 14 described in the first embodiment, description will be omitted here.

The electric storage unit 450 stores power for activating the vibrating apparatus 1D. Power stored in the electric storage unit 450 is supplied to the electronic equipment 2 through the power feeding connector 456. The electric storage unit 450 may be, for example, a secondary battery which can perform charging and discharging. In such a case, the electric storage unit 450 can perform charging by a cable through which power can be supplied being connected to a charging connector 430 on the bottom. Further, the vibrating apparatus 1D may include a battery lamp 432 and may inform the operator 3 of the remaining power amount of the electric storage unit 450 using brightness or color of the battery lamp 432.

Inside the equipment holding unit 40, a control substrate 420 is provided, and on one side face of the equipment holding unit 40, a mode switching switch 424, an output switching switch 426, a stereo mini jack 428 and a sound output window 404A are provided.

Note that because the control substrate 420, the mode switching switch 424, the output switching switch 426, the stereo mini jack 428 and the sound output window 404A are substantially the same as the control substrate 120, the mode switching switch 124, the output switching switch 126, the stereo mini jack 128 and the sound output window 104A described in the first embodiment, description will be omitted here.

Further, as illustrated in FIG. 10C, on the back face of the vibrating apparatus 1D, a power feeding switch 456A and a stereo plug switch 434A which physically or electrically disconnect to the electric equipment 2 via the power feeding connector 456 and the stereo mini plug 434 are provided. For example, the operator 3 may turn off vibration and sound output of the vibrating apparatus 1D and use the vibrating apparatus 1D as an extended battery of the electronic equipment 2 by turning off the stereo plug switch 434A. Further, the operator 3 may turn off vibration and sound output of the vibrating apparatus 1D and the power feeding function of the vibrating apparatus 1D and use the vibrating apparatus 1D as an additional grip of the electronic equipment 2 by turning off the stereo plug switch 434A and the power feeding switch 456A.

As described above, because the vibrating apparatus 1D according to the fourth embodiment of the present disclosure can feed power from the electric storage unit 450 of the vibrating apparatus 1D to the electronic equipment 2, the vibrating apparatus 1D can be used as the extended battery of the electronic equipment 2. Further, because, in the vibrating apparatus 1D, the power feeding control unit 454 can control whether or not to feed power from the electric storage unit 450 to the electronic equipment 2, the vibrating apparatus 1D can control power feeding so that electric storage units of the vibrating apparatus 1D and the electronic equipment 2 run out of the batteries substantially at the same time.

6. FIFTH EMBODIMENT

Figure 11:
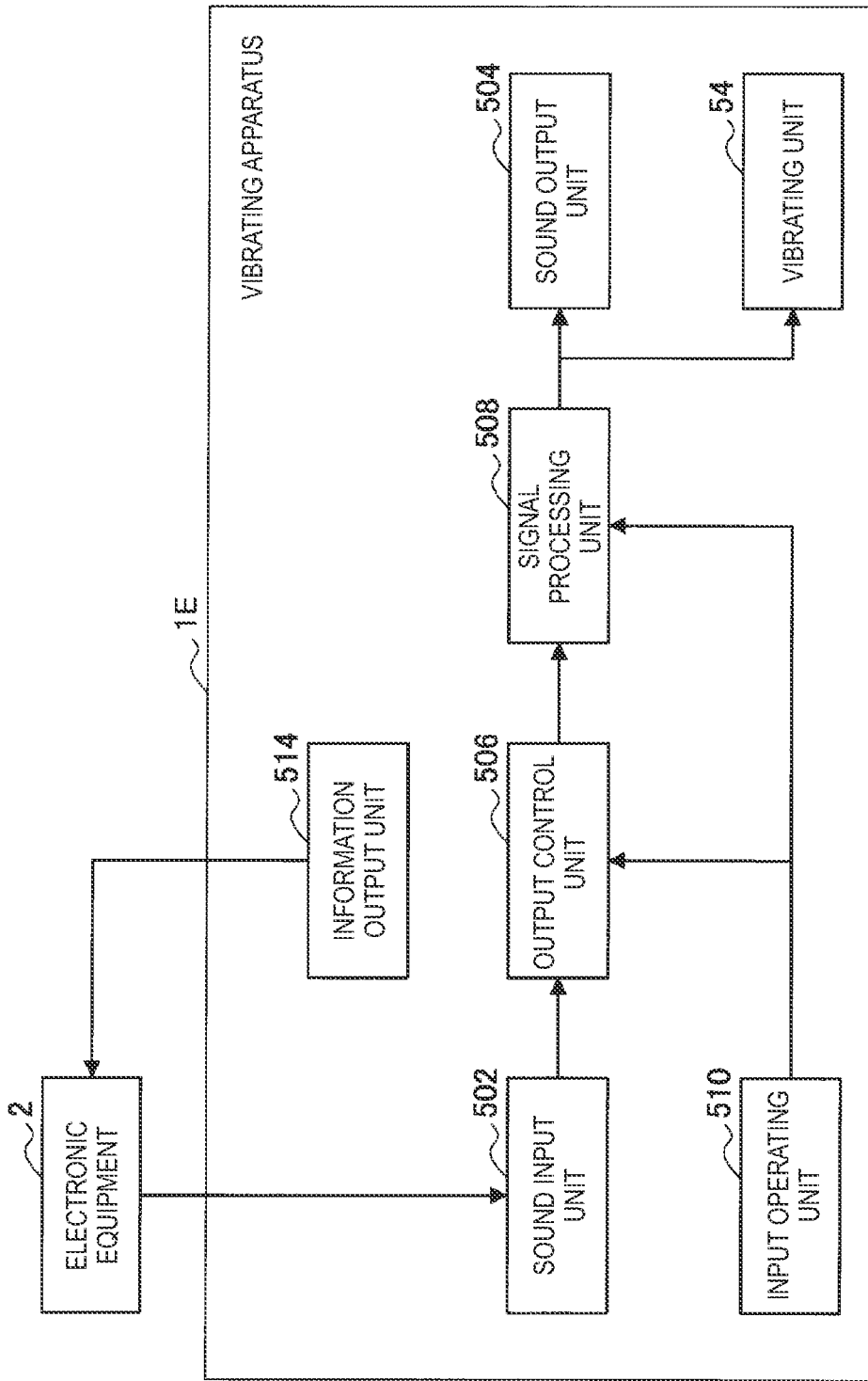
FIG. 11 is a block diagram illustrating a configuration of a vibrating apparatus according to a fifth embodiment of the present disclosure.

Further, a vibrating apparatus 1E according to a fifth embodiment of the present disclosure will be described with reference to FIG. 11. The vibrating apparatus 1E according to the fifth embodiment of the present disclosure is an embodiment in which an information output unit configured to output information to the electronic equipment 2 is further provided, so that information can be input from the vibrating apparatus 1E to the electronic equipment 2.

[6.1. Configuration Example of Vibrating Apparatus]

A configuration of the vibrating apparatus 1E according to the fifth embodiment of the present disclosure will be described with reference to FIG. 11. FIG. 11 is a block diagram illustrating the configuration of the vibrating apparatus 1E according to the fifth embodiment of the present disclosure. As illustrated in FIG. 11, the vibrating apparatus 1E includes a sound input unit 502, a sound output unit 504, an output control unit 506, a signal processing unit 508, a vibrating unit 54, an input operating unit 510 and an information output unit 514.

Here, because the sound input unit 502 is substantially the same as the sound input unit 102 described in the first embodiment, the sound output unit 504 is substantially the same as the sound output unit 104, the output control unit 506 is substantially the same as the output control unit 106, the signal processing unit 508 is substantially the same as the signal processing unit 108, the vibrating unit 54 is substantially the same as the vibrating unit 14, and the input operating unit 510 is substantially the same as the input operating unit 110, description will be omitted here.

The information output unit 514 is a connection interface for outputting information from the vibrating apparatus 1E to the electronic equipment 2. For example, when the vibrating apparatus 1E has a microphone or a terminal for connecting to a microphone, the information output unit 514 outputs sound information acquired through the microphone to the electronic equipment 2, thereby can use the sound information as input for a chat function of content to be executed at the electronic equipment 2. Further, when the vibrating apparatus 1E has an additional button, or the like, the information output unit 514 outputs information relating to whether or not the button is depressed to the electronic equipment 2, thereby can make up for deficiencies of an input apparatus at the electronic equipment 2.

According to such a configuration, the vibrating apparatus 1E according to the fifth embodiment of the present disclosure can implement a function as an input apparatus to be added to the electronic equipment 2 as well as a function of providing a vibratory sense to the operator 3.

7. CONCLUSION

As described above, according to the vibrating apparatus 1 according to the present disclosure, by the vibrating unit 14 vibrating the gripped portion 12 gripped by the operator 3 with the whole flat of the hands, it is possible to transmit a larger vibratory sense to the operator 3 than a case where the operator 3 holds the electronic equipment 2 only with the tip of the finger.

Further, because the vibrating apparatus 1 according to the present disclosure causes the vibrating unit 14 to vibrate based on the sound signal from the electronic equipment 2, even when content executed at the electronic equipment 2 does not send a signal dedicated for causing the vibrating apparatus 1 to vibrate, it is possible to transmit a vibratory sense to the operator 3.

Still further, the vibrating apparatus 1 according to the present disclosure can also have a function for feeding power and a function of inputting information to the electronic equipment 2, and can be used as an extended battery or an additional input apparatus for the electronic equipment 2.

Note that it is also possible to independently combine the configurations of the vibrating apparatuses according to the second to the fifth embodiments to the vibrating apparatus 1A according to the first embodiment of the present disclosure, and these combinations are incorporated into the technical content according to the present disclosure.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification. Additionally, the present technology may also be configured as below.

(1)

A vibrating apparatus including:

an equipment holding unit configured to hold electronic equipment;

at least one gripped portion projecting from the equipment holding unit and gripped by an operator; and at least one vibrating unit configured to vibrate based on a sound signal acquired from the electronic equipment and vibrate the at least one gripped portion.

(2)

The vibrating apparatus according to (1), further including:

a sound output unit configured to output sound based on the sound signal acquired from the electronic equipment.

(3)

The vibrating apparatus according to (2), further including:

an output control unit configured to control at least one of a degree of vibration of the at least one vibrating unit and a volume of sound output of the sound output unit.

(4)

The vibrating apparatus according to (2) or (3), further including:

a signal processing unit configured to perform predetermined signal processing according to a type of content on the sound signal acquired from the electronic equipment and output sound signals used for vibration of the at least one vibrating unit and sound output of the sound output unit, respectively.

(5)

The vibrating apparatus according to (1), wherein the at least one vibrating unit further includes a sound output function and further outputs sound based on the sound signal acquired from the electronic equipment.

(6)

The vibrating apparatus according to (5), further including:

an output control unit configured to perform signal processing of reducing a signal of a predetermined frequency band on the sound signal acquired from the electronic equipment and control vibration of the at least one vibrating unit and sound output.

(7)

The vibrating apparatus according to any one of (1) to (6), wherein the at least one gripped portion includes a plurality of gripped portions, and the plurality of gripped portions are each provided with the at least one vibrating unit, the at least one vibrating unit including at least one or more vibrating units.

(8)

The vibrating apparatus according to any one of (1) to (7), wherein the at least one gripped portion is connected to the equipment holding unit so that a projecting direction can be changed.

(9)

The vibrating apparatus according to (8), further including:

a vibration control unit configured to control vibration of the at least one vibrating unit based on the projecting direction of the at least one gripped portion with respect to the equipment holding unit.

(10)

The vibrating apparatus according to (8), wherein the at least one gripped portion further includes a contact sensor, and the vibrating apparatus further includes a vibration control unit configured to control vibration of the at least one vibrating unit based on a state where the operator contacts the at least one gripped portion, the state being determined at the contact sensor.

(11)

The vibrating apparatus according to any one of (1) to (10), further including:

an electric storage unit configured to store power; and a power feeding unit configured to feed the power stored in the electric storage unit to the electronic equipment.

(12)

The vibrating apparatus according to (11), further including:

a power feeding control unit configured to control power feeding from the power feeding unit to the electronic equipment, wherein the power feeding control unit controls power feeding to the electronic equipment based on an amount of power stored in the electric storage unit.

(13)

The vibrating apparatus according to (11), wherein the power feeding control unit controls power feeding to the electronic equipment further based on an amount of power stored in an electric storage unit provided in the electronic equipment.

(14)

The vibrating apparatus according to any one of (1) to (13), further including:

an information output unit configured to output information to the electronic equipment.

(15)

A vibrating method including:

acquiring, by a vibrating apparatus, a sound signal from electronic equipment held at an equipment holding unit of the vibrating apparatus; and vibrating, by the vibrating apparatus, at least one gripped portion projecting from the equipment holding unit and gripped by an operator, based on the acquired sound signal.

REFERENCE SIGNS LIST 1 vibrating apparatus
2 electronic equipment
3 operator
10 equipment holding unit
12 gripped portion
14 vibrating unit
102 sound input unit
104 sound output unit
106 output control unit
108 signal processing unit
110 input operating unit 312 vibration control unit
450 electric storage unit
452 power feeding unit
514 information output unit

The invention claimed is:

1. An information processing apparatus, comprising:
   at least one vibration actuator;
   a storage unit configured to store content data and content type information associated with the content data;
   at least one sound output unit configured to output a sound signal of the content data;
   first circuitry configured to control vibration of the at least one vibration actuator based on each of the sound signal of the content data and the content type information; and
   second circuitry configured to:
      reduce a signal of a specific frequency band, wherein the signal of the specific frequency band corresponds to the sound signal; and
      control, based on the reduction of the signal of the specific frequency band, the vibration of the at least one vibration actuator and the output of the sound signal.

2. The information processing apparatus according to claim 1, further comprising third circuitry configured to control at least one of a degree of vibration of the at least one vibration actuator or a volume of the sound signal.

3. The information processing apparatus according to claim 1, further comprising third circuitry configured to control, based on the sound signal, the vibration of the at least one vibration actuator and the output of the sound signal.

4. The information processing apparatus according to claim 1, further comprising a plurality of gripped portions, wherein
   at least one gripped portion of the plurality of gripped portions is configured to be gripped by an operator of the information processing apparatus, and
   each gripped portion of the plurality of gripped portions comprises the at least one vibration actuator.

5. The information processing apparatus according to claim 4, wherein
   the at least one gripped portion comprises a contact sensor configured to detect a contact of the operator with the at least one gripped portion, and
   the first circuitry is further configured to control the vibration of the at least one vibration actuator based on the detection of the contact of the operator with the at least one gripped portion.

6. The information processing apparatus according to claim 1, further comprising a mode switching switch configured to select a setting based on an input of an operator of the information processing apparatus, wherein
   the first circuitry is further configured to independently control the vibration of the at least one vibration actuator and the output of the sound signal, based on the selection of the setting.

7. A method, comprising:
   in an information processing apparatus:
      storing, in a storage unit of the information processing apparatus, content data and content type information associated with the content data;
      outputting, by a sound output unit of the information processing apparatus, a sound signal of the content data;
      controlling vibration of at least one vibration actuator of the information processing apparatus based on each of the sound signal of the content data and the content type information;
      reducing a signal of a specific frequency band, wherein the signal of the specific frequency band corresponds to the sound signal; and
      controlling, based on the reduction of the signal of the specific frequency band, the vibration of the at least one vibration actuator and the output of the sound signal.

8. The method according to claim 7, further comprising controlling at least one of a degree of vibration of the at least one vibration actuator or a volume of the sound signal.

9. The method according to claim 7, further comprising controlling, based on the sound signal, the vibration of the at least one vibration actuator and the output of the sound signal.

10. The method according to claim 7, further comprising:
    detecting, by a contact sensor of the information processing apparatus, a contact of an operator of the information processing apparatus with at least one gripped portion of a plurality of gripped portions of the information processing apparatus; and
    controlling the vibration of the at least one vibration actuator based on the detection of the contact of the operator with the at least one gripped portion.

11. The method according to claim 7, further comprising:
    selecting a setting based on an input of an operator of the information processing apparatus; and
    independently controlling the vibration of the at least one vibration actuator and the output of the sound signal, based on the selection of the setting.

12. A non-transitory computer-readable medium having stored thereon computer-executable instructions, which when executed by a computer, cause the computer to execute operations, the operations comprising:
    storing content data and content type information related to the content data;
    controlling at least one sound output unit to output a sound signal of the content data;
    controlling vibration of at least one vibration actuator based on each of the sound signal of the content data and the content type information;
    reducing a signal of a specific frequency band, wherein the signal of the specific frequency band corresponds to the sound signal; and
    controlling, based on the reduction of the signal of the specific frequency band, the vibration of the at least one vibration actuator and the output of the sound signal.

13. The non-transitory computer-readable medium according to claim 12, wherein the operations further comprise controlling at least one of a degree of vibration of the at least one vibration actuator or a volume of the sound signal.

14. The non-transitory computer-readable medium according to claim 12, wherein the operations further comprise controlling, based on the sound signal, the vibration of the at least one vibration actuator and the output of the sound signal.

15. The non-transitory computer-readable medium according to claim 12, wherein the operations further comprise:

detecting a contact of an operator of an information processing apparatus with at least one gripped portion of a plurality of gripped portions of the information processing apparatus; and controlling the vibration of the at least one vibration actuator based on the detection of the contact of the operator with the at least one gripped portion.

16. The non-transitory computer-readable medium according to claim 12, wherein the operations further comprise:

selecting a setting based on an input of an operator of an information processing apparatus; and independently controlling the vibration of the at least one vibration actuator and the output of the sound signal, based on the selection of the setting.

* * * * *